United States Patent
Islam et al.

(10) Patent No.: US 10,521,930 B1
(45) Date of Patent: Dec. 31, 2019

(54) METHOD AND SYSTEM FOR PERFORMING AUTOMATIC CAMERA CALIBRATION FOR A SCANNING SYSTEM

(71) Applicant: MUJIN, INC., Sumida-Ku, Tokyo (JP)

(72) Inventors: Russell Islam, Tokyo (JP); Xutao Ye, Tokyo (JP)

(73) Assignee: MUJIN, INC., Tokyo (JP)

( * ) Notice: Subject to any disclaimer, the term of this patent is extended or adjusted under 35 U.S.C. 154(b) by 0 days.

(21) Appl. No.: 16/506,695

(22) Filed: Jul. 9, 2019

(51) Int. Cl.
*G06T 7/80* (2017.01)
*H04N 13/246* (2018.01)
*G06T 7/73* (2017.01)

(52) U.S. Cl.
CPC .............. *G06T 7/85* (2017.01); *G06T 7/75* (2017.01); *H04N 13/246* (2018.05); *G06T 2207/10012* (2013.01)

(58) Field of Classification Search
CPC ... G06T 7/85; G06T 7/75; G06T 2207/10012; H04N 13/246
See application file for complete search history.

(56) References Cited

U.S. PATENT DOCUMENTS

| | | | |
|---|---|---|---|
| 9,272,417 B2 * | 3/2016 | Konolige | B25J 5/007 |
| 10,124,489 B2 * | 11/2018 | Chitta | B25J 9/1687 |
| 10,350,755 B2 | 7/2019 | Wagner et al. | |
| 10,369,701 B1 * | 8/2019 | Diankov | B25J 9/1697 |
| 10,373,336 B1 * | 8/2019 | Islam | B25J 9/1692 |
| 2010/0222915 A1 * | 9/2010 | Kuehnemann | B65G 57/00 700/217 |
| 2017/0248966 A1 * | 8/2017 | Lutz | B25J 9/1697 |
| 2018/0194008 A1 * | 7/2018 | Namiki | B25J 9/1692 |
| 2019/0102911 A1 * | 4/2019 | Natroshvili | B60R 1/00 |
| 2019/0122388 A1 * | 4/2019 | Li | H04N 5/247 |

* cited by examiner

*Primary Examiner* — Padma Haliyur
(74) *Attorney, Agent, or Firm* — Medler Ferro Woodhouse & Mills PLLC

(57) ABSTRACT

A system and method for performing automatic camera calibration is presented. The system communicates with a first camera and a second camera, wherein a transparent platform is disposed between the two cameras. When a 3D calibration pattern is disposed on the platform, the system receives a first set of calibration images from the first camera, and a second set of calibration images from the second camera. The system determines, based on the first set of calibration images, a first set of coordinates for corners of the polyhedron. The system further determines, based on the second set of calibration images, a second set of coordinates for the corners. The system determines, based on the coordinates, a spatial relationship between the first camera and the second camera. The system further uses a description of the spatial relationship to generate a 3D model of an object other than the 3D calibration pattern.

20 Claims, 17 Drawing Sheets

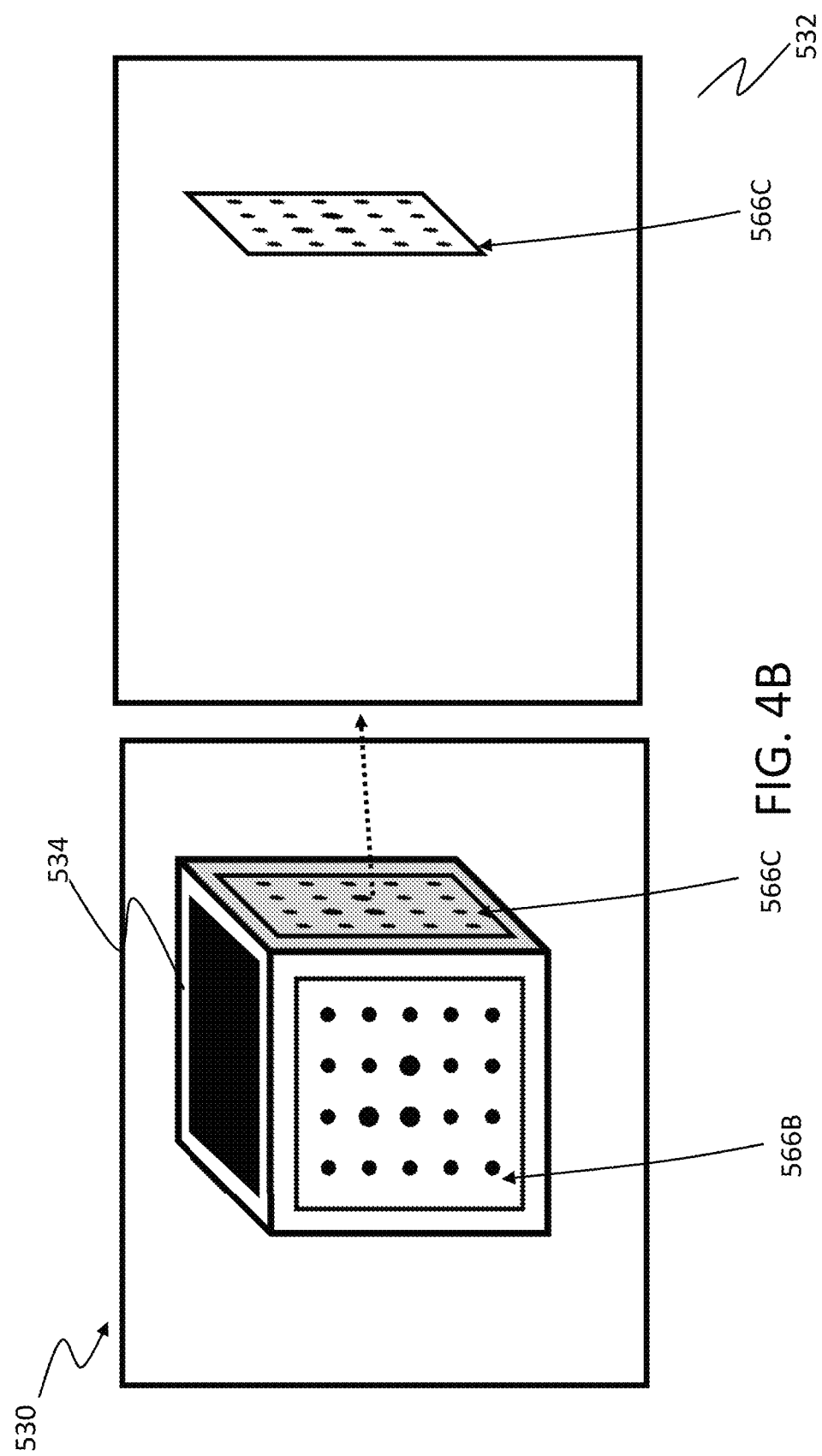

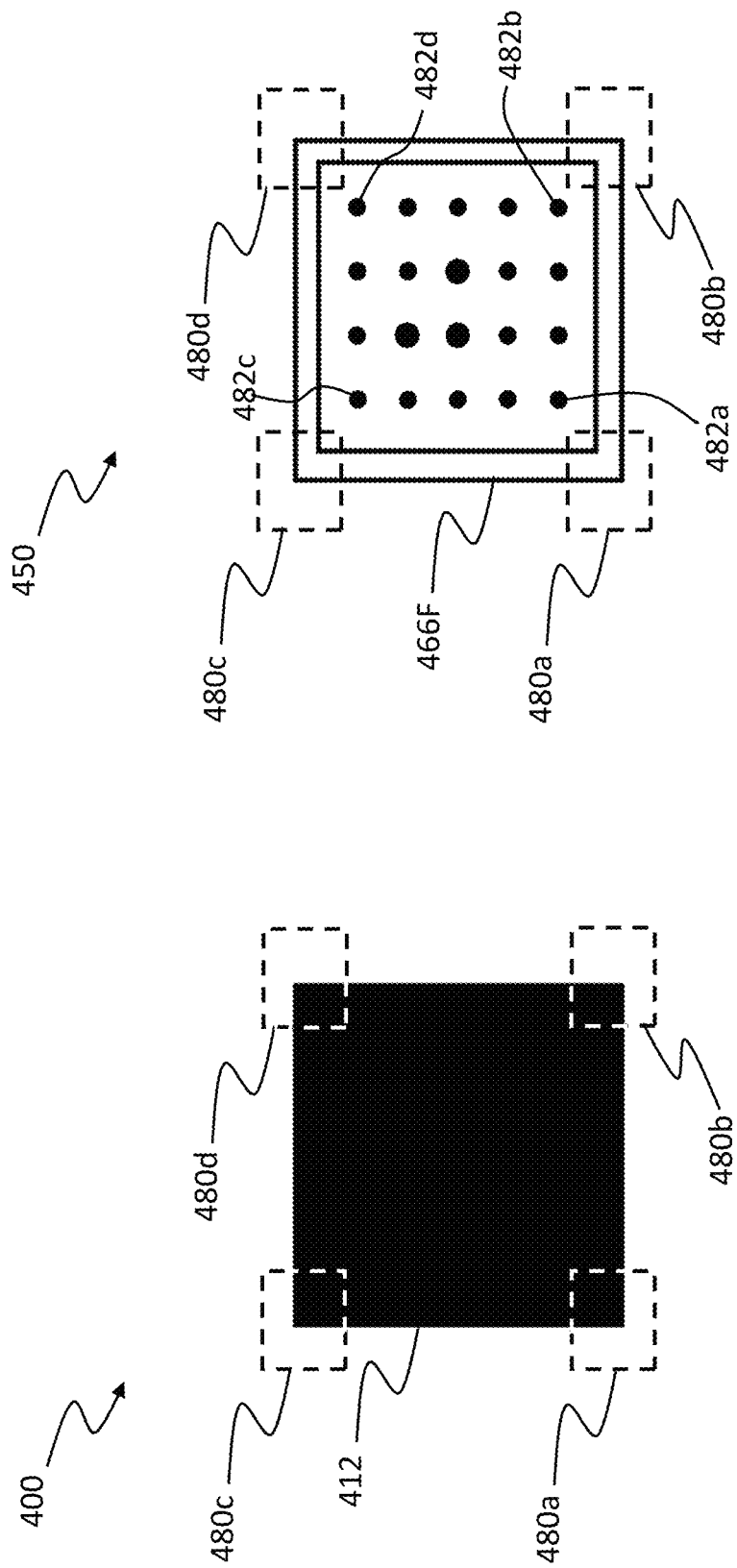

METHOD AND SYSTEM FOR PERFORMING AUTOMATIC CAMERA CALIBRATION FOR A SCANNING SYSTEM

FIELD OF THE INVENTION

The present invention is directed to a method and system for performing automatic camera calibration for a scanning system.

BACKGROUND

Object scanning has been used to determine features of an object, such as its shape. Some implementations of the object scanning rely on images of the object acquired by a camera. Results of the object scanning have in some instances been used to generate a three-dimensional (3D) model of the object. The 3D model may be used in automation context, such as a context in which a robot interacts with the object.

SUMMARY

One aspect of the embodiments herein relates to a method, computing system, and a non-transitory computer-readable medium having instructions for performing automatic camera calibration. The computing system comprises a communication interface and a control circuit. The communication interface is configured to communicate with: (i) a first camera, (ii) a second camera, and (iii) an actuator for rotating a platform that is transparent and that is disposed between the first camera and the second camera, wherein the first camera is pointed toward a first surface of the platform, and the second camera is pointed toward a second and opposite surface of the platform. The control circuit is configured to perform camera calibration when a three-dimensional (3D) calibration pattern is disposed on the first surface of the platform. The 3D calibration pattern comprises a polyhedron having a plurality of faces that include a first set of faces and an additional face that is not part of the first set of faces, and comprises a first set of 2D calibration patterns disposed on respective faces of the first set of faces. The camera calibration is performed by: receiving a first set of calibration images via the communication interface from the first camera, wherein the first set of calibration images capture the first set of faces of the polyhedron and capture the first set of 2D calibration patterns disposed respectively on the first set of faces, without capturing the additional face of the polyhedron; and by receiving a second set of one or more calibration images via the communication interface from the second camera, wherein the second set of one or more calibration images capture the additional face of the polyhedron. The camera calibration is further performed by determining, based on the first set of 2D calibration patterns, a first set of coordinates for representing a set of respective corners of the additional face of the polyhedron, wherein the first set of coordinates are relative to a location and orientation of the first camera; and by determining, based on the second set of one or more calibration images, a second set of coordinates for representing the set of respective corners of the additional face of the polyhedron, wherein the second set of coordinates are relative to a location and orientation of the second camera. The camera calibration is further performed by determining, based on the first set of coordinates and the second set of coordinates, a transformation function for describing a spatial relationship between the first camera and the second camera. The control circuit is further configured, after the camera calibration has been performed and when an object other than the 3D calibration pattern is disposed on the first surface of the platform, to generate a 3D model for representing the object, wherein the 3D model is generated based on the transformation function, based on images of the object received via the communication interface from the first camera, and based on images of the object received via the communication interface from the second camera.

BRIEF DESCRIPTION OF THE DRAWINGS

The foregoing and other features, objects and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIGS. 4A-4C depict examples of various calibration images generated by a first camera, according to an embodiment herein.

FIGS. 5A-5D depict examples of various calibration images generated by a second camera, according to an embodiment herein.

DETAILED DESCRIPTION

Figure 1A:
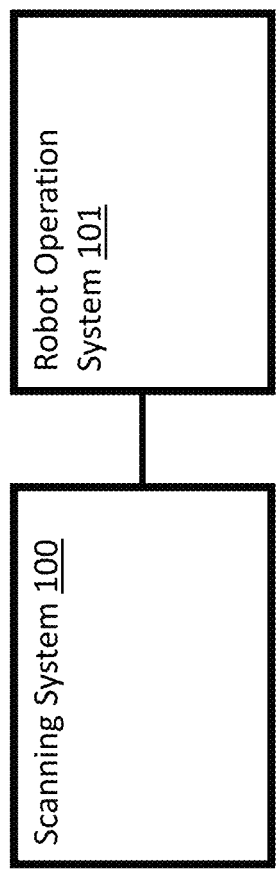
FIG. 1A depicts a block diagram of a scanning system in communication with a robot operation system in accordance with an embodiment herein.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments described herein relate to determining a spatial relationship between a first camera and a second camera as part of a calibration operation for a scanning system. In an embodiment, the scanning system may comprise multiple cameras that can acquire images of an object from different perspectives. The images may be used to generate a 3D model of the object. In some cases, the 3D model may be used to facilitate interaction between a robot and the object, or a class of objects to which the object belongs. For instance, the object may be a package in a warehouse, and the 3D model of the object may be used by a robot control system to determine how a robot arm can pick up the package. In an embodiment, the first camera and the second camera of the scanning system may view respective regions of the object that generally do not overlap. For instance, the scanning system may include a transparent platform on which the object is placed. The first camera may be, e.g., disposed above a top surface of the transparent platform, and may be pointed in a direction that provides the first camera with a perspective view of the object. In this example, the second camera may be, e.g., disposed under a bottom surface of the transparent platform, and may be pointed in a direction that provides the second camera with a bottom view of the object. In the above example, the first camera may be referred to as a top camera, and the second camera may be referred to as a bottom camera. One aspect of the embodiments herein relate to a calibration operation that determines a spatial relationship between such a first camera and such a second camera. The spatial relationship may later be used to, e.g., determine how to combine an image acquired by the first camera with an image acquired by the second camera.

In an embodiment, the calibration operation may be performed with a 3D calibration pattern that is disposed on the transparent platform. The 3D calibration pattern may, e.g., include a polyhedron and a plurality of 2D calibration patterns disposed on respective faces of the polyhedron. In some instances, the calibration operation may involve determining a first set of coordinates of respective locations on the 3D calibration pattern (also referred to a first set of coordinates for representing the respective locations on the 3D calibration pattern), wherein the first set of coordinates are relative to a location and orientation of the first camera. The calibration operation may further involve determining a second set of coordinates for the same respective locations (also referred to as a second set of coordinates for representing the same respective locations), wherein the second set of coordinates are relative to a location and orientation of the second camera. For instance, the respective locations may be locations of bottom corners of the polyhedron of the 3D calibration pattern. The spatial relationship between the first camera and the second camera may be determined based on the first set of coordinates for the bottom corners and the second set of coordinates for the same bottom corners. In some cases, the location and orientation of the first camera may be represented by a coordinate system of the first camera, and the location and orientation of the second camera may be represented by a coordinate system of the second camera. In such cases, the first set of coordinates may be in the coordinate system of the first camera, and the second set of coordinates may be in the coordinate system of the second camera.

In an embodiment, the calibration operation may involve determining the first set of coordinates for the locations (e.g., bottom corners) on the 3D calibration pattern by determining coordinates for other locations (e.g., top corners) of the 3D calibration pattern, and using known information about a dimension or dimensions the 3D calibration pattern to then determine the first set of coordinates. For instance, if the first set of coordinates belong to the bottom corners of the polyhedron of the 3D calibration pattern, such an embodiment may involve initially determining a set of coordinates of top corners of the polyhedron, and then determining the first set of coordinates of the bottom corners of the polyhedron as coordinates which are separated from the top corners of the polyhedron by the known dimension of the polyhedron, such as a known size of each edge of the polyhedron.

In an embodiment, the calibration operation may involve determining a 3D model of the 3D calibration pattern. In some cases, the 3D model may include information that describes imaginary planes which are defined by, or that more generally represent, the faces of the polyhedron of the 3D calibration pattern. That is, the imaginary planes may form at least part of a 3D model of the polyhedron. In such an embodiment, the calibration operation may determine a coordinate of a particular corner (e.g., a corner of a top face) of the polyhedron based on the 3D model of the polyhedron. For instance, the coordinate of that corner may be determined as an intersection of at least three imaginary planes of the polyhedron.

In an embodiment, generating images of the 3D calibration pattern (which may be referred to as calibration images) with the second camera may involve generating pairs of calibration images, wherein each pair includes a first calibration image that captures a silhouette of a particular face (e.g., bottom face) of the polyhedron, and a second calibration image that captures a 2D calibration pattern disposed on that face. In such an embodiment, the second camera may view the 3D calibration pattern through a transparent material, such as glass. The glass may introduce a source of imaging error, such as by introducing an effect of light refraction or light scattering into a calibration image. The imaging error may increase a level of difficulty of accurately identifying a corner of a face of the polyhedron, or some other feature of the 3D calibration pattern, from the calibration image. The use of both the first calibration image and the second calibration image to identify the corner may, however, compensate for an effect of the imaging error, and may thus increase a robustness by which the corner or other feature of the 3D calibration pattern can be identified from a calibration image, and increase an overall robustness of the calibration operation.

In an embodiment, the first calibration image, which captures the silhouette of a particular face of the polyhedron of the 3D calibration pattern, may be generated with a first lighting condition. The first lighting condition may be created by activating a first light source (e.g., top light source) that is behind that face of the polyhedron from a point of view of the second camera, and deactivating a second light source (e.g., bottom light source) that is pointed at that face of the polyhedron. The second camera may then acquire the first calibration image after the first lighting condition has been created. In an embodiment, the second calibration image, which captures a 2D calibration pattern disposed on that face of the polyhedron, may be generated with a second lighting condition. The second lighting condition may be created by deactivating the first light source, and activating the second light source. The second camera may then acquire the second calibration image after the second lighting condition has been created.

As stated above, the calibration operation may facilitate an ability of a scanning system to generate images and/or a 3D model of an object, and the 3D model may facilitate an ability of a robot to interact with the object. FIG. 1A illustrates a block diagram of a scanning system 100 that is configured to communicate with a robot operation system 101. The scanning system 100 (also referred to as a registration system 100 or product registration system 100) may be used to scan an object, and more specifically to acquire images of an object, wherein the images may be used to generate a 3D model (e.g., a point cloud) of the object. The images of the object may be used to facilitate an ability of the robot operation system 101 to interact with the object, or with other objects having substantially the same shape and/or size as the object. In an embodiment, the scanning system 100 may be configured to generate the 3D model of the object based on the images acquired by the scanning system 100, and may be configured to communicate the 3D model of the object to the robot operation system 101. In an embodiment, the scanning system 100 may be configured to communicate the acquired images of the object to the robot operation system 101, and the robot operation system 101 may generate a 3D model of the object based on the acquired images.

In an embodiment, the scanning system 100 and/or the robot operation system 101 may be deployed within a warehouse, a manufacturing plant, or other premises. In such an embodiment, the object being scanned may be, e.g., a product in the warehouse (e.g., a piece of merchandise), a part used in manufacturing an end product in the manufacturing plant, or some other object. The scanning system 100 may scan the object so as to determine a property of the object, a 3D model of the object (e.g., information describing a shape and size of the object), or some other information regarding the object. The 3D model or other information regarding the object may be used by the robot operation system 101 to interact with the object. For instance, the robot operation system 101 may include a robot having a robot arm, and the interaction may involve the robot arm picking up the object, such as in a bin picking operation for picking up packages in a warehouse. An example of the robot operation system 101 is described in more detail in U.S. patent application Ser. No. 16/295,940, entitled "Method and System for Performing Automatic Camera Calibration for Robot Control," the entire content of which is incorporated herein by reference in its entirety. In an embodiment, the robot operation system 101 may comprise a robot control system (also referred to as a robot controller) for controlling the robot. In some cases, the scanning system 100 may be configured to communicate a 3D model of an object, acquired images of the object, or other information to the robot control system. In an embodiment, the robot operation system 101 may include a vision system that includes one or more cameras. An example of the vision system is described in more detail in U.S. patent application Ser. No. 16/438,084, entitled "Method and Control System for Updating a First Image Generated by a First Camera Based on a Second Image Generated by a Second Camera," the entire content of which is herein incorporated by reference in its entirety. In some cases, the scanning system 100 may be configured to communicate the 3D model, acquired images of the object, or other information to the vision system.

Figure 1B:
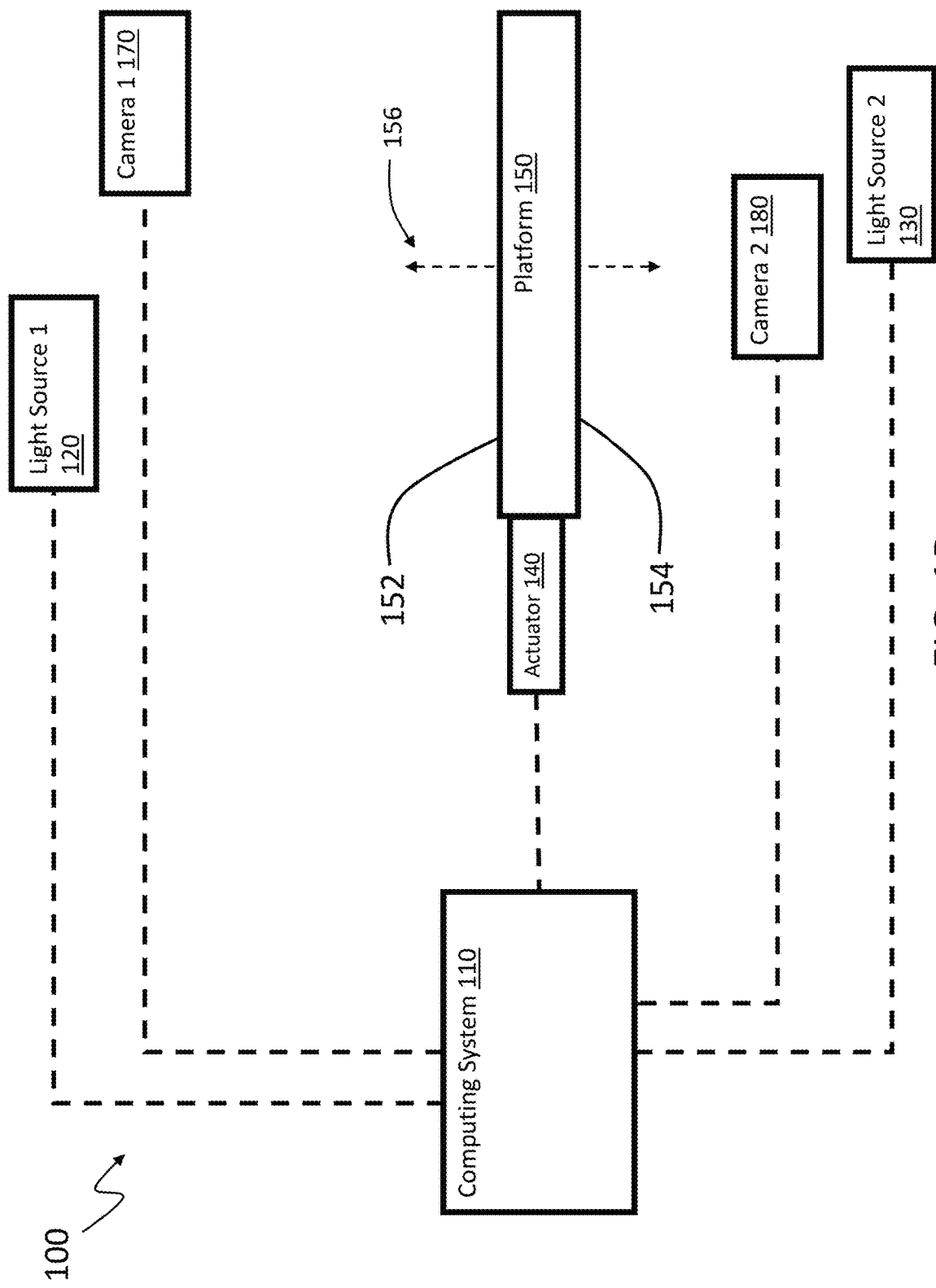
FIG. 1B depicts block diagrams of components of a scanning system, according to an embodiment herein.

FIG. 1B depicts block diagrams of an embodiment of the scanning system 100. In the embodiment depicted in FIG. 1B, the scanning system 100 includes a computing system 110 (also referred to as a scanning control system or a scan controller), an actuator 140, a platform 150, a first camera 170 (labeled as "Camera 1"), and a second camera 180 (labeled as "Camera 2"). In some instances, the scanning system 100 may further include one or more light sources, such as a first light source 120 (labeled as "Light Source 1") and a second light source 130 (labeled as "Light Source 2") depicted in FIG. 1B. In an embodiment, the scanning system 100 may include an enclosed housing, such as a box, that provides an enclosed space within which some or all components of the scanning system 100 are located.

In an embodiment, the platform 150 may provide a surface on which an object to be scanned can be placed. In some cases, the platform 150 is able to undergo motion, so as to move the object with the motion of the platform 150. For instance, the platform 150 may be a circular glass plate that is rotatable about a center of the plate by the actuator 140 (e.g., a motor). The rotation of the platform 150 may allow different portions of the object to be brought into a field of view of, e.g., the first camera 170. In an embodiment, the surface on which the object can be placed may be a first surface of the platform (e.g., a top surface), while the platform may further have a second and opposite surface (e.g., bottom surface).

In an embodiment, the platform 150 may be disposed between the first camera 170 and the second camera 180. For instance, FIG. 1B illustrates a first surface 152 (e.g., top surface) of the platform 150, and a second surface 154 (e.g., bottom surface) of the platform 150, wherein the first surface 152 and second surface 154 are opposite surfaces of the platform 150. In this example, the first camera 170 may be disposed adjacent to the first surface 152 of the platform 150, with the first surface 152 being disposed between the first camera 170 and the second surface 154 of the platform 150. For instance, the first camera 170 may be disposed above (also referred to as being disposed over) the first surface 152. Further, the first camera 170 may be pointed toward the first surface 152 of the platform 150 (e.g., a top surface of the platform 150). Further in this example, the second camera 180 may be disposed adjacent to the second surface 154 of the platform 150, with the second surface 154 being disposed between the second camera 180 and the first surface 152 of the platform. For instance, the second camera 180 may be disposed below (also referred to as being disposed under) the second surface 154. Additionally, the second camera 180 may be pointed toward the second surface 154 of the platform 150 (e.g., a bottom surface of the platform 150). In some cases, the first surface 152 and the second surface 154 may both be a flat surface, and may be parallel to each other.

In an embodiment, the platform 150 may be a transparent platform, such as a glass plate. When an object is placed on the transparent platform, various regions on the object may be visible to at least one of the first camera 170 or the second camera 180. For instance, a first region (e.g., top region) on the object may not be visible to the second camera 180, but may be visible to the first camera 170. Similarly, a second region (e.g., bottom region) of the object may not be visible to the first camera 170, but may be visible to the second camera 180. Further, if some regions are initially obstructed from view relative to, e.g., the first camera 170, movement of the platform 150 may subsequently allow those regions to be brought into view, as discussed above.

In an embodiment, the first camera 170 and/or the second camera 180 may be a color camera, a black-and-white camera, a depth-sensing camera, a video camera, any combination thereof, or any other type of camera. In an embodiment, the first camera 170 may be disposed off-center relative to the platform 150. In such an embodiment, the first camera 170 is not disposed directly over a center of the platform 150. The center of the platform 150 may refer to, e.g., a center of the first surface 152 of the platform 150, a center of the second surface 154 of the platform 150, or an average of those two locations. As a more specific example, the first camera 170 may be off-center by not intersecting a central axis 156 of the platform 150 of FIG. 1B, wherein the central axis 156 may be an axis that is perpendicular to the first surface 152 or the second surface 154 of the platform 150 and that extends through the center of the platform 150. In some cases, the first camera 170 may have an orientation in which the first camera 170 is tilted relative to the first surface 152 of the platform 150, and is pointed in a direction toward the first surface 152 of the platform 150. Such an orientation may allow the first camera 170 to have a perspective view an object disposed on the first surface 152 of the platform 150, as opposed to having only, e.g., a top view of the object. For instance, when an object is placed on the first surface 152 of the platform 150, the tilt of the first camera 170 may allow multiple regions, such as a top region and a side region, to be simultaneously visible to the first camera 170. As a more specific example, the first camera 170 may be tilted relative to the first surface 152 of the platform 150 by having an orientation in which an optical axis of the first camera 170 is not parallel (or, more generally, not aligned) with the central axis 156 of the platform 150.

In an embodiment, the second camera 180 may be centered relative to the platform 150. For instance, the second camera 180 may intersect the central axis 156 of the platform 150. As a more specific example, the second camera 180 may be centered relative to the platform 150 when a lens or an image sensor of the second camera 180 intersects the central axis 156. In another embodiment, the second camera 180 may be off-center relative to the platform 150. In an embodiment, the second camera 180 may have no tilt relative to the second surface 154 of the platform 150, such that the second camera 180 has an orientation in which an optical axis of the second camera 180 is parallel with the central axis 156, or in which the optical axis of the second camera 180 is perpendicular to an imaginary plane defined or formed by the second surface 154. In such an embodiment, when an object is placed on the first surface of the platform 150, the orientation of the second camera 180 may cause the second camera 180 to view the object head-on through a transparent material of the platform 150. For instance, if the second surface 154 of the platform 150 is a bottom surface, the second camera 180 may have, e.g., only a bottom view of the object through the glass or other material of the platform 150. The lack of tilt of the second camera 180 may minimize an amount of light refraction, light scattering, or other sources of distortion arising from light passing through the transparent material of the platform 150. Such a result may reduce an amount of imaging error in an image acquired by the second camera 180.

In an embodiment, the first light source 120 may be disposed adjacent to (e.g., disposed above) the first surface 152 of the platform 150, with the first surface 152 disposed between the first light source 120 and the surface 154 of the platform 150. The first light source 120 may be pointed toward the first surface 152 of the platform 150. Further, the second light source 130 may be disposed adjacent to (e.g., disposed below) the second surface 154 of the platform 150, with the second surface 154 disposed between the second light source 130 and the first surface 152 of the platform 150. The second light source 130 may be pointed toward the second surface 154 of the platform 150. Each of the first light source 120 and the second light source 130 may be, e.g., a light emitting diode (LED), a halogen lamp, or any other light source. Further, the first light source 120 and the second light source 130 may be configured to emit visible light, infrared radiation, or any other form of light toward the first surface 152 and the second surface 154, respectively, of the platform 150. In some implementations, the computing system 110 may control the first light source 120 to control a lighting condition for the first surface 152 of the platform 150, and may control the second light source 130 to control a lighting condition for the second surface 154 of the platform 150.

In an embodiment, the computing system 110 (also referred to as a scanning control system or scanning controller) may be in communication with and/or configured to control one or more of the first camera 170, the second camera 180, the first light source 120, the second light source 130, and/or the actuator 140. In some cases, the communication may occur via, e.g., a RS-232 interface, a universal serial bus (USB) interface, an Ethernet interface, a Bluetooth® interface, an IEEE 802.11 interface, or any combination thereof. In some cases, the communication may occur via a local computer bus, such as a peripheral component interconnect (PCI) bus.

Figure 1C:
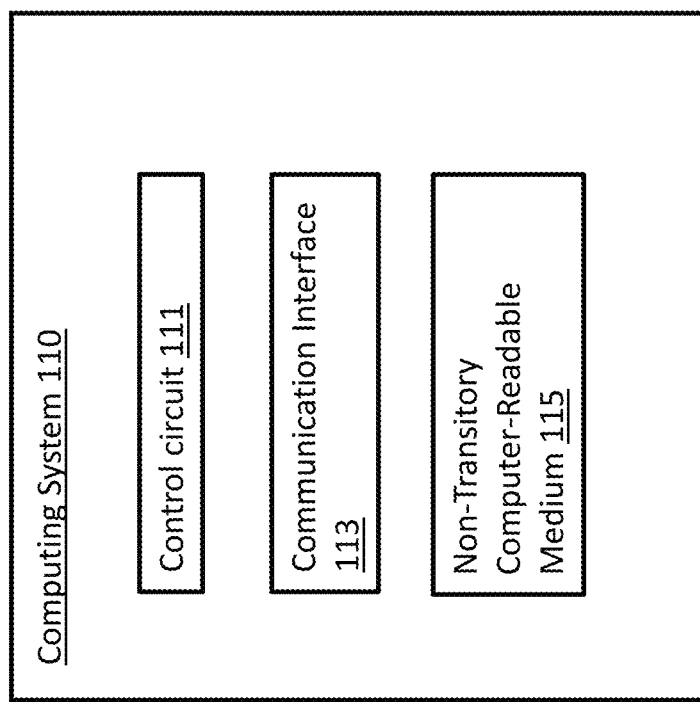
FIG. 1C depicts a block diagram of a computing system configured to perform camera calibration, according to an embodiment herein.

FIG. 1C depicts a block diagram of the computing system 110. The computing system 110 may be a computer, a control chip, a circuit board, or any other computing system. As illustrated in the block diagram of FIG. 1C, the computing system 110 can include a control circuit 111, a communication interface 113, and a non-transitory computer-readable medium 115 (e.g., memory).

In an embodiment, the communication interface 113 may include one or more components that are configured to communicate with the actuator 140, the first camera 170, the second camera 180, the first light source 120, and/or the second light source 130 of FIG. 1B, and/or with the robot operation system 101 of FIG. 1A. In some instances, the communication interface 113 may include a communication circuit configured to perform communication over a wired or wireless protocol. As an example, the communication circuit may include a RS-232 port controller, a USB controller, an Ethernet controller, a Bluetooth® controller, a PCI bus controller, any other communication circuit, or a combination thereof.

In an embodiment, the control circuit 111 may include one or more processors, a programmable logic circuit (PLC) or a programmable logic array (PLA), a field programmable gate array (FPGA), an application specific integrated circuit (ASIC), or any other control circuit. In an embodiment, the non-transitory computer-readable medium 115 may include computer memory. The computer memory may comprise, e.g., dynamic random access memory (DRAM), solid state integrated memory, and/or a hard disk drive (HDD). In some cases, the non-transitory computer-readable medium 115 may store instructions (e.g., computer code) that the control circuit 111 is configured to execute, such as instructions to perform camera calibration, as discussed below in more detail. In such cases, the control circuit 111 may include one or more processors configured to perform the computer-executable instructions to perform the camera calibration.

In an embodiment, the computing system 110 may be a dedicated control system (also referred to as a dedicated controller) that controls only operation of the scanning system 100, including operation of the actuator 140 of FIG. 1B, the first camera 170 of FIG. 1B, the second camera 180 of FIG. 1B, the first light source 120 of FIG. 1B, and/or the second light source 130 of FIG. 1B. In other cases, the computing system 110 may be configured to control additional operations, such as operations of a robot operation system (e.g., robot operation system 101 of FIG. 1A). In an embodiment, the computing system 110 may be local to other components of the scanning system 100, such as to the platform 150, the actuator 140, the first camera 170, the second camera 180, the first light source 120, and/or the second light source 130. In an embodiment, the computing system 110 may be remote from one or more other components of the scanning system 100. For instance, if the platform 150, the actuator 140, the first camera 170, the second camera 180, the first light source 120, and the second light source 130 are located in a warehouse or other premises, the computing system 110 may be disposed in a data center or other location that is remote from the warehouse, and may be configured to communicate with those other components of the scanning system 100 via a network connection.

In an embodiment, the computing system 110 may be configured to retrieve or otherwise receive images acquired by the first camera 170 and images acquired by the second camera. In some instances, the images may be of a calibration pattern, as discussed below in more detail (such images may be referred to as calibration images). In an embodiment, the computing system 110 may be configured to control the first camera 170 and/or the second camera 180 to acquire such calibration images. For example, the computing system 110 may be configured to generate a camera command that causes the first camera 170 and/or the second camera 180 to acquire or otherwise generate an image of a scene in a field of view of the first camera 170 or of the second camera 180, respectively (the field of view of a camera may also be referred to as a camera field of view). The same camera command or a different camera command may further cause the first camera 170 and/or the second camera 180 to communicate the acquired images to the computing system 110 via the communication interface 113 of FIG. 1C, or more generally to a storage device (e.g., the non-transitory computer-readable medium 115 of FIG. 1C) accessible by the computing system 110. In an embodiment, the first camera 170 and/or the second camera 180 may automatically acquire or otherwise generate images of a scene in their respective camera fields of view, either periodically or in response to a defined triggering condition, without needing a camera command from the computing system 110. In such an embodiment, the first camera 170 and/or the second camera 180 may also be configured to automatically, without a camera command from the computing system 110, communicate the acquired images to the computing system 110 or, more generally, to a storage device accessible by the computing system 110.

In an embodiment, the control circuit 111 or other component of the computing system 110 may be configured to generate a movement command that, when received by the actuator 140, causes the actuator 140 to actuate (e.g., rotate) the platform 150. The movement command may be communicated from the control circuit 111 to the actuator 140 via the communication interface 113. In one example, the actuator 140 may be a motor, and the movement command may be a motor command, or any other type of movement command.

In an embodiment, the control circuit 111 or other component of the computing system 110 may be configured to generate a lighting command for the first light source 120 and/or the second light source 130, and to communicate the lighting command from the control circuit 111 to the first light source 120 and/or second light source 130 via the communication interface 113. The lighting command may, e.g., control whether a particular light source is activated or deactivated, or a manner by which the light source is activated, such as an intensity or duration by which the light source is activated.

Figure 1D:
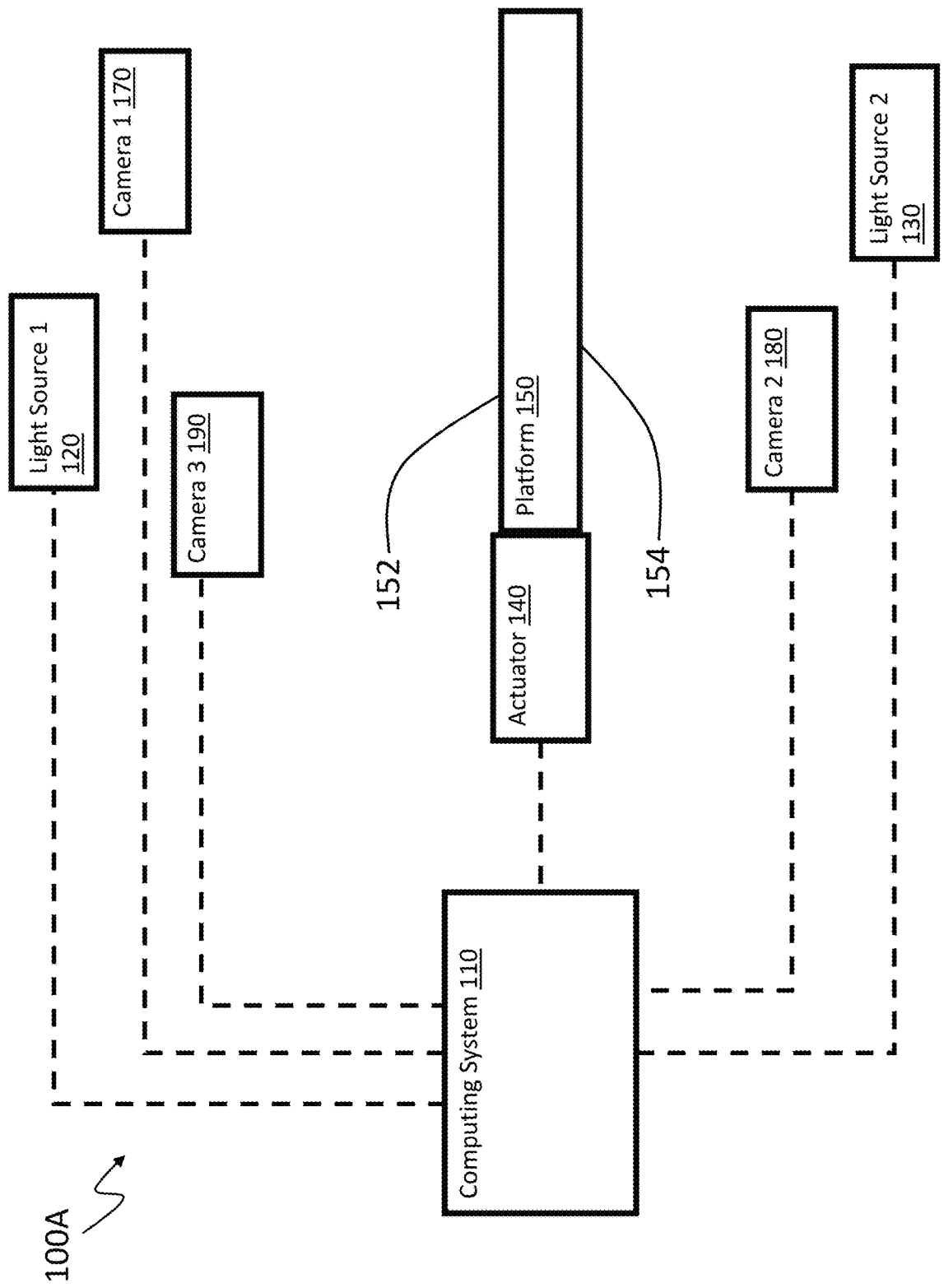
FIGS. 1D and 1E depict block diagrams of a scanning system, according to an embodiment herein.

In an embodiment, the only cameras in the scanning system 100 of FIG. 1B are the first camera 160 and the second camera 170. In an embodiment, the scanning system 100 may include additional cameras, such as three cameras or more cameras. For instance, FIG. 1D depicts a scanning system 100A, which is an embodiment of the scanning system 100, that includes a third camera 190 (labeled as "Camera 3"), as well as the first camera 170 and the second camera 180. In this embodiment, both the first camera 170 and the third camera 190 may be disposed adjacent to the first surface 152 of the platform 150 (e.g., disposed over the first surface 152), while the platform 150 is disposed between the third camera 190 and the second camera 180, as well as being located between the first camera 170 and the second camera 180. More specifically, the first surface 152 may be disposed between the third camera 190 and the second surface 154 of the platform 150, and may be disposed between the first camera 170 and the second surface 154 of the platform 150. The third camera 190 may be off-center relative to the platform 150, or may be centered relative to the platform 150. Further, the third camera 190 may be tilted relative to the first surface 152 of the platform 150, or may have no tilt relative to the first surface 152 of the platform 150. The first camera 170 and the third camera 190 may cover different perspectives or viewpoints of an object that is placed on the platform 150. In some cases, the presence of both the first camera 170 and the third camera 190 may provide the computing system 110 with a stereoscopic view of regions on the object that are visible to both the first camera 170 and the third camera 190.

Figure 1E:
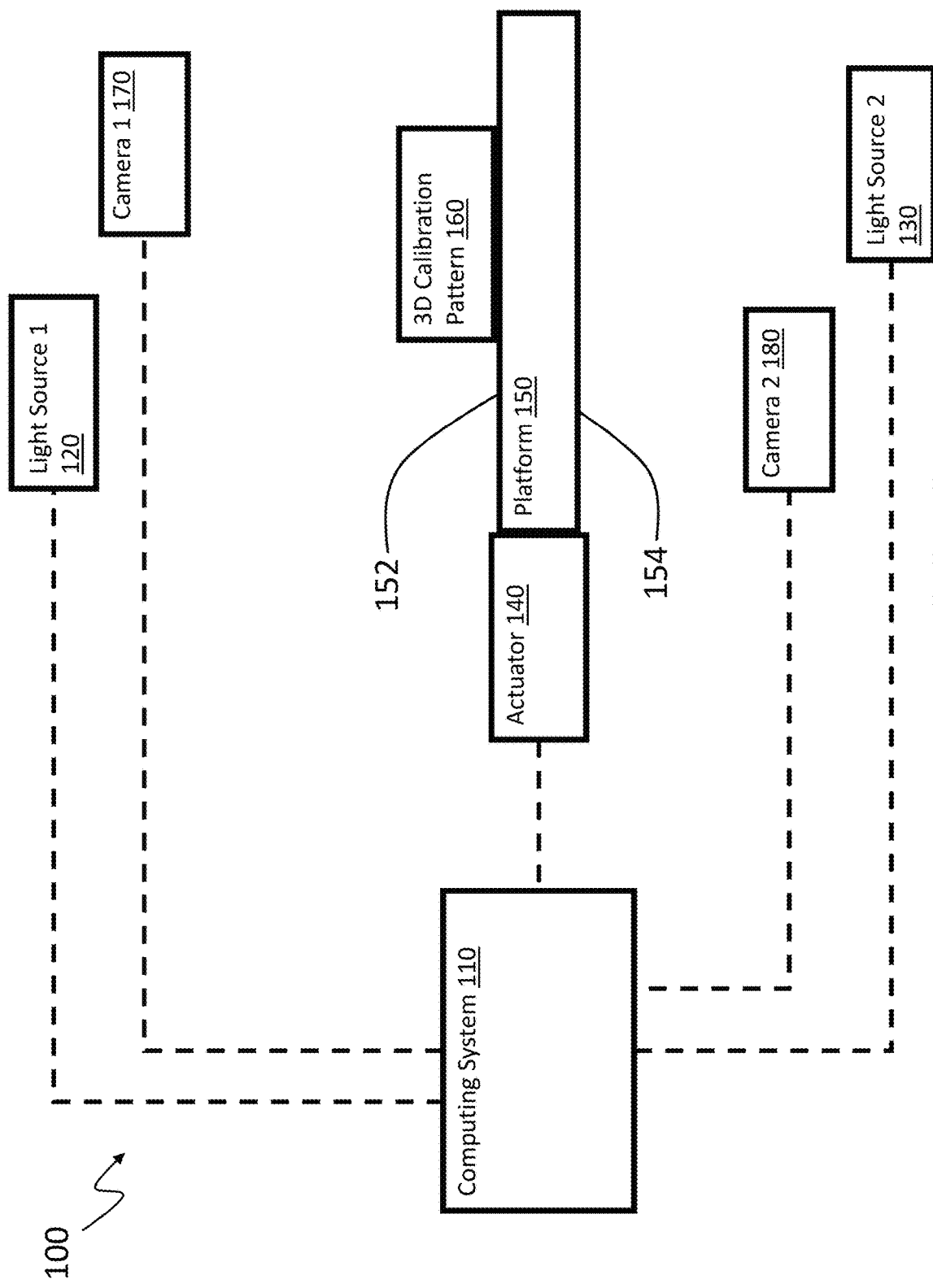

As stated above, one aspect of the present disclosure relates to performing camera calibration based on images of a calibration pattern. FIG. 1E depicts an embodiment in which a 3D calibration pattern 160 is used to perform the camera calibration. More specifically, the 3D calibration pattern 160 is disposed on the first surface 152 of the platform 150 of the scanning system 100, and the computing system 110 thereof is configured to perform camera calibration based on calibration images of the 3D calibration pattern 160. As discussed in more detail below, one example of the 3D calibration pattern 160 includes a polyhedron having a plurality of 2D patterns disposed on respective faces of the polyhedron. The polyhedron may have a respective 2D pattern disposed on each of its faces, or on only a subset of its faces.

As stated above, the first camera 170 may in an embodiment have an orientation in which the first camera 170 is tilted relative to the first surface 152 of the platform 150. Such an orientation may provide the first camera 170 with a perspective view of the 3D calibration pattern 160, which may allow multiple faces of the 3D calibration pattern 160 to be visible to the first camera 170, or more generally to be within a camera field of view of the first camera 170. In an embodiment, as also stated above, the second camera 180 may have an orientation in which the second camera 180 has no tilt relative to the second surface 154 of the platform 150. Such an orientation may cause only one face or only a subset of faces of the polyhedron of the 3D calibration pattern 160 to be visible to the second camera 180. For instance, the second camera 180 in such an embodiment may be able to view only a bottom face of the polyhedron. In other words, the second camera 170 in such an example may have only a bottom view of the 3D calibration pattern 160.

In an embodiment, the computing system 110 may be configured to control the actuator 140 to actuate the platform 150, such as to rotate the platform 150 about a center thereof. Such a movement may cause the 3D calibration pattern 160 to be placed at different locations and/or different orientations relative to the first camera 170 and/or the second camera 180. Further, if a particular face of the 3D calibration pattern 160 is initially hidden from view relative to, e.g., the first camera 170, the platform 150 may subsequently move that face into view relative to, e.g., the first camera 170. In an embodiment, the computing system 110 may be configured to control the first light source 120 and/or the second light source 130 to be activated when the first camera 170 and/or the second camera 180 are acquiring images of the 3D calibration pattern 160, so as to illuminate one or more faces of the polyhedron of the 3D calibration pattern 160.

Figure 2:
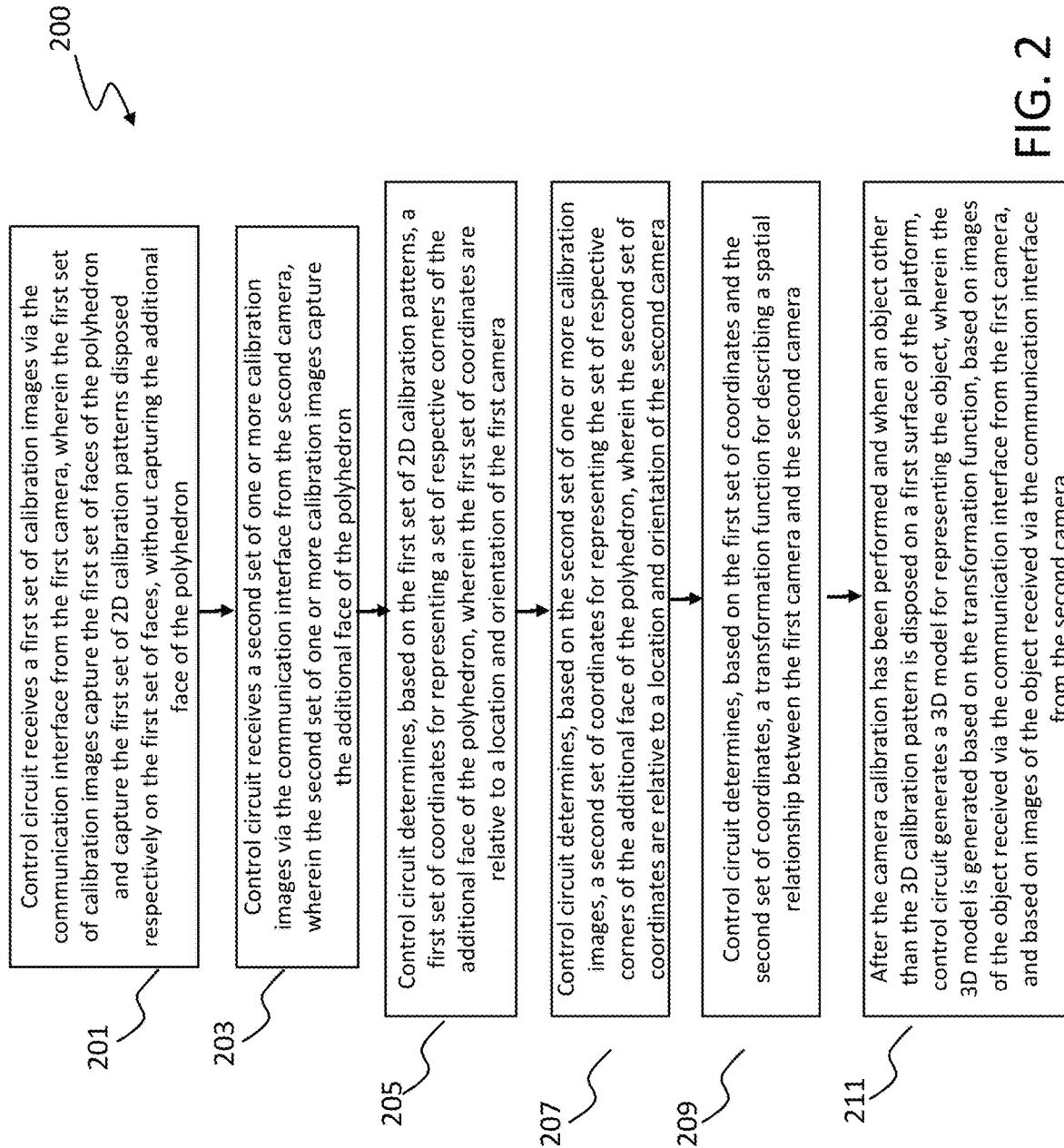
FIG. 2 depicts a flow diagram that illustrates a method for determining a spatial relationship between a first camera and a second camera, according to an embodiment herein.

FIG. 2 depicts a flow diagram that illustrates a method 200 for performing camera calibration for a scanning system, such as the scanning system 100 of FIGS. 1A-1E, based on calibration images of a calibration pattern, such as the 3D calibration pattern 160 of FIG. 1E. The method 200 may in an embodiment perform camera calibration according to steps 201-209, and may then generate a 3D model of an object in step 211 using information determined from the camera calibration. In an embodiment, the method 200 may be performed by the computing system 110, and more specifically by the control circuit 111 of FIG. 1C. In some cases, the control circuit 111 may perform the method 200 based on instructions stored on the non-transitory computer-readable medium 115 of FIG. 1C, or on any other storage device.

In an embodiment, the method 200 may begin with step 201, in which the control circuit 111 receives a first set of calibration images via a communication interface 113 from the first camera 170 of FIGS. 1B, 1D, and/or 1E or more specifically the first camera 370 of FIG. 3A, which is discussed below. The first set of calibration images may be images of the 3D calibration pattern 160, wherein the 3D calibration pattern 160 may include a polyhedron having a plurality of faces, and include a plurality of 2D calibration patterns disposed on the plurality of faces. The plurality of faces may include a first set of faces and an additional face. Further, the first set of calibration images may specifically capture the first set of faces of the polyhedron and capture a first set of 2D calibration patterns disposed respectively on the first set of faces of the polyhedron, without capturing the additional face of the polyhedron.

Figure 3A:
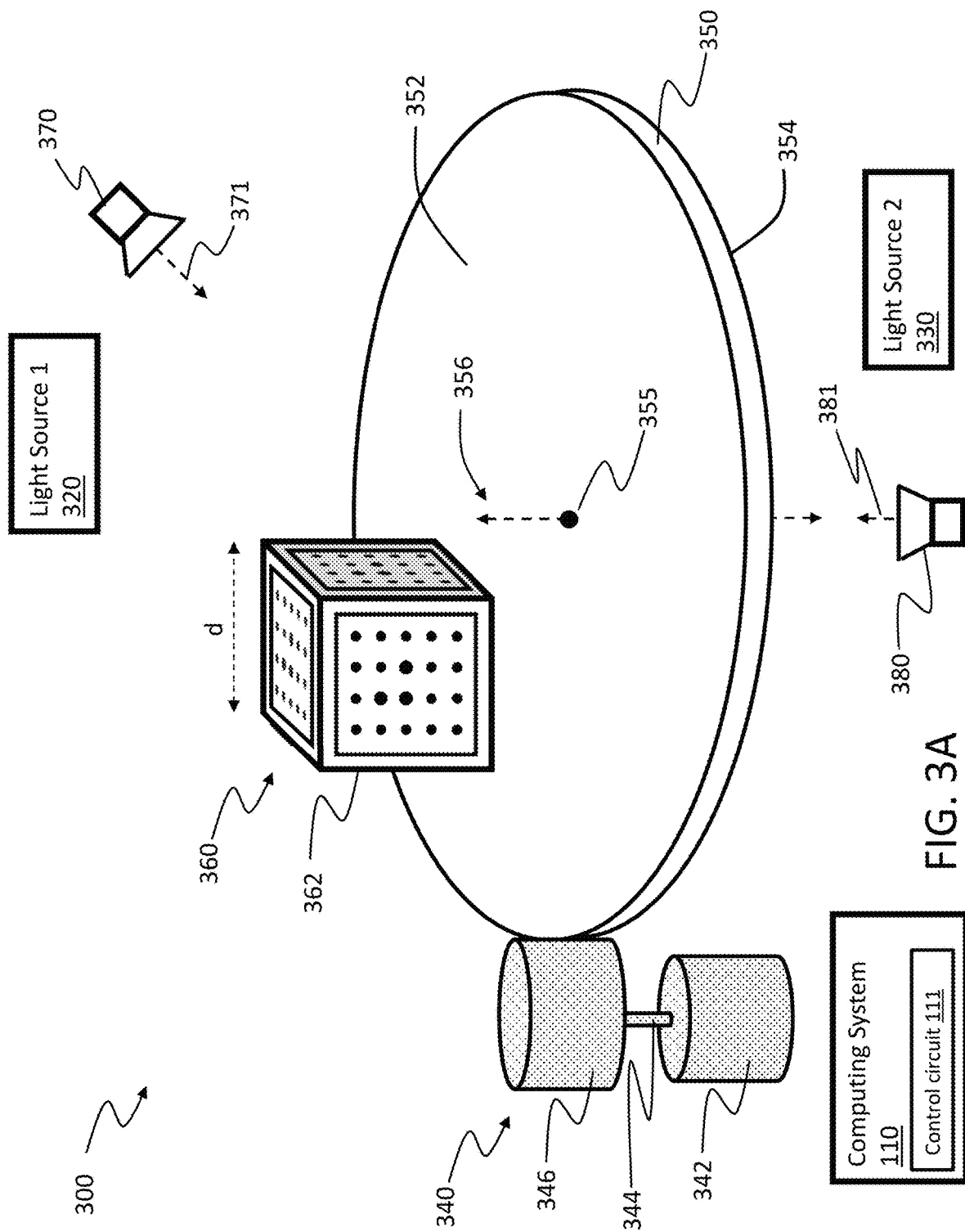
FIG. 3A depicts example components of a scanning system, according to an embodiment herein.

For instance, FIG. 3A depicts an example environment for performing the method 200 of FIG. 2, and more specifically depicts a scanning system 300 that is an embodiment of the scanning system 100 of FIGS. 1A-1E. In this embodiment, the scanning system 300 includes the computing system 110 of FIGS. 1B-1E. The scanning system 300 further includes a platform 350, an actuator 340 configured to actuate the platform 350, includes a first camera 370, a first light source 320, a second camera 380, and a second light source 330, which may be respective embodiments of the platform 150, the actuator 140, the first camera 170, the first light source 120, the second camera 180, and the second light source 130, respectively, of FIGS. 1B and 1D-1E. In an embodiment, the platform 350 is has a first surface 352 and a second surface 354 opposite the first surface 352, and is disposed between the first camera 370 and the second camera 380. As illustrated in FIG. 3A, the first camera 370 and the first light source 370 may be disposed adjacent to the first surface 352 of the platform 350, with the first surface 352 being disposed between the first camera 370 and the second surface 354 (e.g., bottom surface) of the platform 350, and being disposed between the first light source 320 and the second surface 354. The first camera 370 and the first light source 320 may be facing (e.g., pointed toward) the first surface 352 of the platform 350. In one example, the first surface 352 may be a top surface of the platform 350, and the first light source and the first camera 370 may be disposed over the first surface 352.

As further illustrated in FIG. 3A, the second camera 380 and the second light source 330 may be disposed adjacent to the second surface 354 (e.g., a bottom surface) of the platform 350, with the second surface 354 being disposed between the second camera 380 an the first surface 352 of the platform 350, and being disposed between the second light source 330 and the first surface 352. The second camera 380 and the second light source 330 may be facing (e.g., pointed toward) the second surface 354 of the platform 350. In one example, the second surface 354 may be a bottom surface 354 of the platform 350, and the second light source 330 and the second camera 380 may be disposed under the second surface 354. In an embodiment, the first camera 370 and the second camera 380 may each have a respective image sensor (e.g., a charge-coupled diode, or CCD, sensor). In such an embodiment, when the respective image sensor of the first camera 370/second camera 380 is facing a particular surface, the first camera 370/second camera 380 may be considered to be pointed toward that surface. As a more specific example, if the first camera 370 is disposed over and pointed toward the first surface 352 of the platform 350, light which reflects off the first surface 352 or reflects off an object disposed on the first surface 352 can directly reach the image sensor of the first camera 370. In this example, the platform 350 may be transparent, and light may pass through the platform 350 after reflecting off a bottom surface of the object. If the second camera 380 is disposed under and pointed toward the second surface 352, the light reflecting off the bottom surface of the object can directly reach the image sensor of the second camera 380.

In the embodiment of FIG. 3A, the platform 350 may be a circular glass plate or other type of transparent platform, and the actuator 340 may be configured to rotate the platform 350 about a central axis 356. The central axis 356 may be an axis that passes through a center 355 of the platform 350, and that is perpendicular to the first surface 352 or the second surface 354 of the platform 150. In the example of FIG. 3A, the center 355 of the platform 350 may refer to a center of the first surface 352 of the platform 350. As further depicted in FIG. 3A, the actuator 340 may be a motor that includes a rotor 342, a motor shaft 344, and a rotation transfer portion 346 attached to the motor shaft 344. The rotor 342 may be configured to rotate the motor shaft 344, which may be configured to rotate the rotation transfer portion 346. The rotation transfer portion 346 may be configured to apply a torque to the platform 350 to cause the platform 350 to rotate about the central axis 356 of the platform 350. In one example, the rotation transfer portion 346 may be a gear or gearbox that is configured to transfer rotation from the rotor 342 and motor shaft 344 to the platform 350. In another example, the rotation transfer portion 346 may contact a rim of the platform 350 with sufficient friction to cause the platform 350 to rotate when the rotation transfer portion 346 rotates. In an embodiment, the rotor 342 may be controlled by the computing system 110, which may be configured to communicate a drive signal or other form of movement command to the rotor 342. As further illustrated in FIG. 3A, the first camera 370 may have a tilt relative to the first surface 352 of the platform 350. For instance, the first camera 370 may have an orientation in which its optical axis 371 is not parallel with the central axis 356 of the platform 350. In this example, the second camera 380 may have no tilt relative to the second surface 354 of the platform 350. For instance, the second camera 380 may have an orientation in which its optical axis 381 is parallel with the central axis 356 of the platform.

Figure 3C:
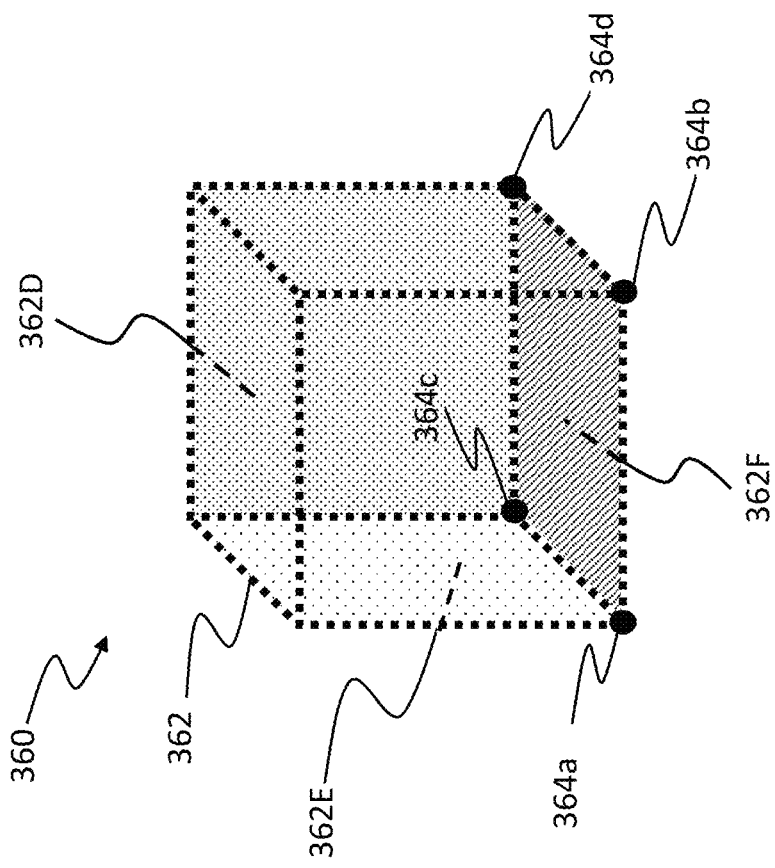
FIGS. 3B and 3C illustrate faces of a polyhedron of a 3D calibration pattern, according to an embodiment herein.
Figure 3B:
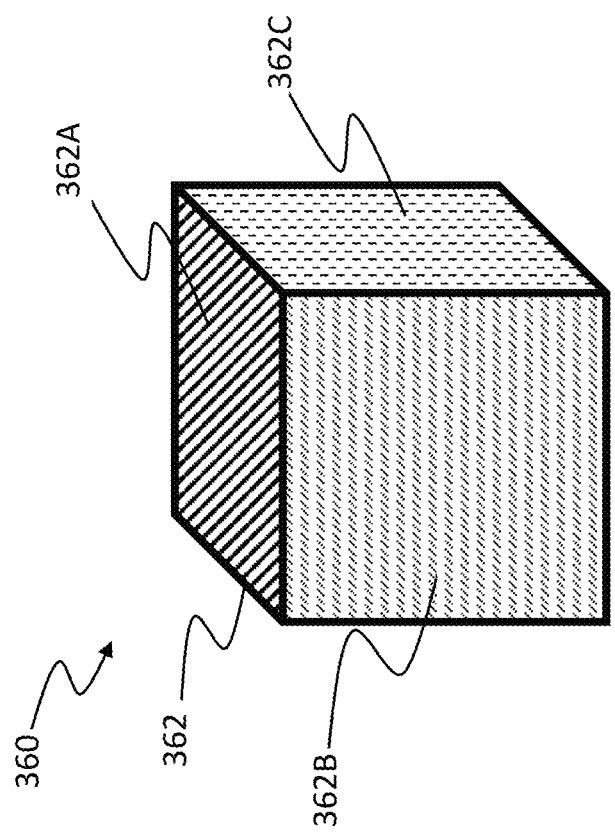

As stated above, step 201 of FIG. 2 may involve receiving the first set of calibration images of the 3D calibration pattern 160 of FIG. 1E. FIG. 3A depicts a 3D calibration pattern 360 that is an embodiment of the 3D calibration pattern 160, wherein the 3D calibration pattern 360 is disposed on the first surface 352 of the platform 350. In an embodiment, the 3D calibration pattern 360 includes a polyhedron 362 having a plurality of faces. In the example of FIG. 3A, the polyhedron 362 is a cube, or more generally a rectangular prism, having a total of six faces. In another example, the 3D calibration pattern 360 may include a different polyhedron, such as a tetrahedron or a dodecahedron. FIGS. 3B and 3C indicate the plurality of faces of the polyhedron 362 of FIG. 3A. More specifically, FIG. 3B identifies three faces, namely face 362A, 362B, and 362C, of the polyhedron 362 of the 3D calibration pattern 360. FIG. 3C presents the polyhedron 362's three remaining faces, namely face 362D, 362E, and 362F, that are not visible in FIG. 3B.

In an embodiment, the polyhedron 362 may have a defined dimension (also referred to as a predefined dimension), which may be, e.g., a defined value of a shape and/or size of the polyhedron 362. For instance, the polyhedron 362 in FIG. 3A may be a cube that was fabricated with a tight tolerance to substantially match a defined dimension "d" (e.g., 50 mm) for each edge of the cube. The fabrication process may have had a high level of precision that limited an amount of deviation from the defined dimension to no more than, e.g., +/−0.5 mm. In some cases, the computing system 110 of FIG. 3A may store a value of the defined dimension, or may be able to retrieve the value of the defined dimension (e.g., from a remote database), and may use the value to perform the camera calibration, as discussed below in more detail.

In an embodiment, the faces of the polyhedron 362 in FIGS. 3B and 3C may be divided into a first set of faces 362A-362E and an additional face 362F, wherein the additional face 362F is not part of the first set of faces 362A-362E. The additional face 362F may also be considered to be part of a second set of one or more faces of the polyhedron 362, wherein the second set of one or more faces (e.g., 362F) have no face in common with the first set of faces 362A-362E.

In an embodiment, the first set of faces 362A-362E may be faces of the polyhedron 362 that are visible to first camera 370 (of FIG. 3A) or can be rotated by the platform 350 to a location at which they are visible to the first camera 370. For instance, the first set of faces 362A-362E may include a top face and four side faces of the polyhedron 362. In an embodiment, the first set of faces 362A-362E may be faces of the polyhedron 362 that are not visible to the second camera 380 (of FIG. 3A). In some situations, the first set of faces 362A-362E may never be visible to the second camera 380 even when the polyhedron 362 is moved by the platform 350. Such situations may occur when, e.g., the second camera 380 has a location and/or orientation that prevents it from intercepting or otherwise collecting any light reflecting off the first set of faces 362A-362E. For example, these situations may occur when the second camera 380 is located very close to the second surface 354 of the platform 350 and has no tilt relative to the second surface 354 of the platform 350.

In an embodiment, the additional face 362F may be a face of the polyhedron 362 that is never visible to the first camera 370 and is visible to the second camera 380. For instance, the additional face 362F may be a bottom face of the polyhedron 362 that is directly contacting the platform 350 of FIG. 3A (e.g., the first surface 352 of the platform 350), while the first set of faces 362A-362E may be faces of the polyhedron 362 that are not directly contacting the platform 350. In the embodiment of FIGS. 3B and 3C, in which the polyhedron 362 is a cube, the first set of faces 362A-362E may have exactly five faces, and the additional face 362F may be only a single additional face 362F that is visible to the second camera 380 and not visible to the first camera 370. In another embodiment in which the polyhedron 362 is different than a cube (e.g., the polyhedron 362 is a dodecahedron), the faces of the polyhedron 362 may be divided into a first set of faces that are visible to the first camera 370, and multiple additional faces (also referred to as a second set of faces) that are visible to the second camera 380 and not visible to the first camera 370.

Figures 3D, 3E:
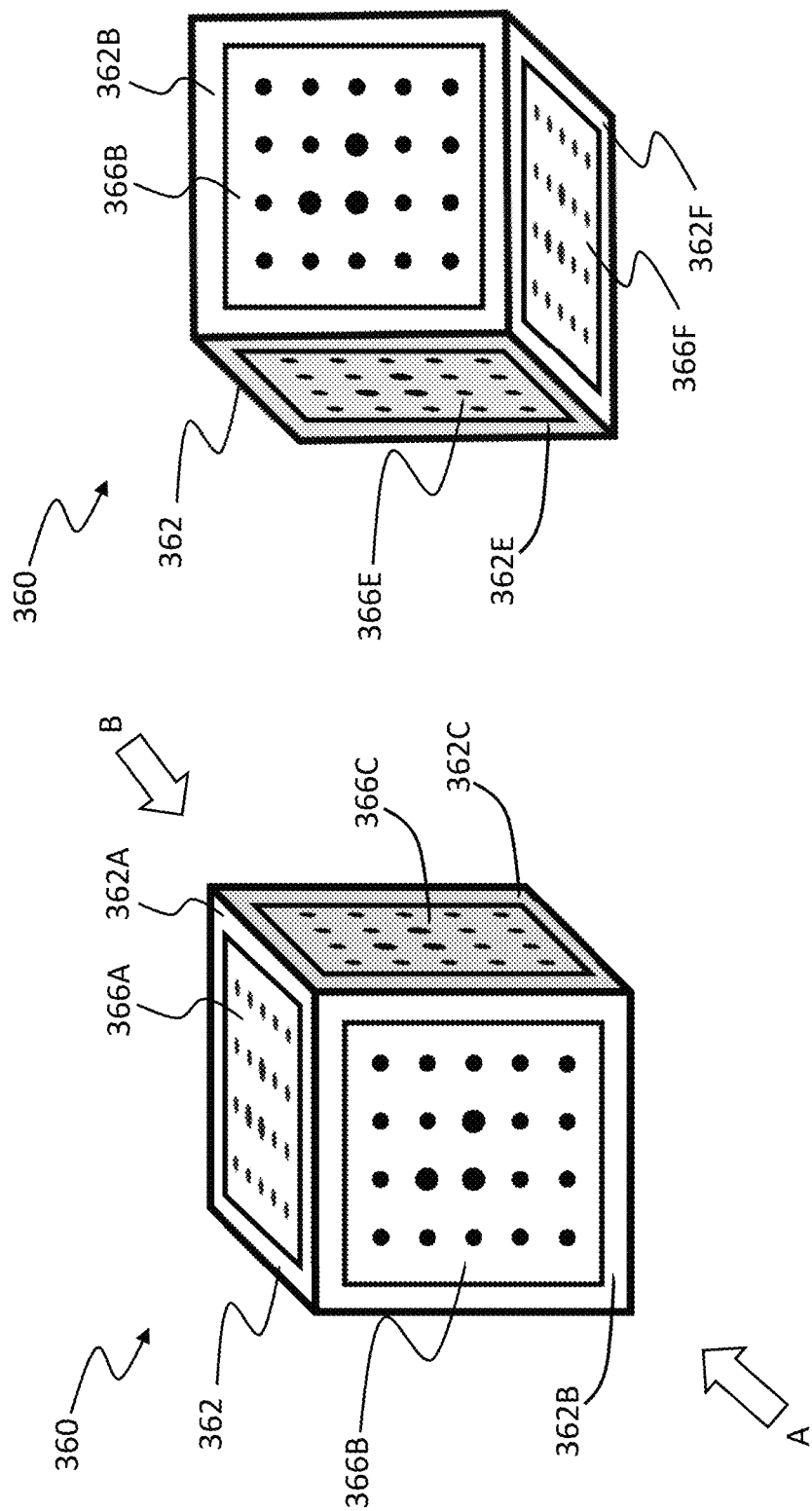
FIGS. 3D-3F illustrate 2D calibration patterns that are part of a 3D calibration pattern, according to an embodiment herein.
Figure 3F:
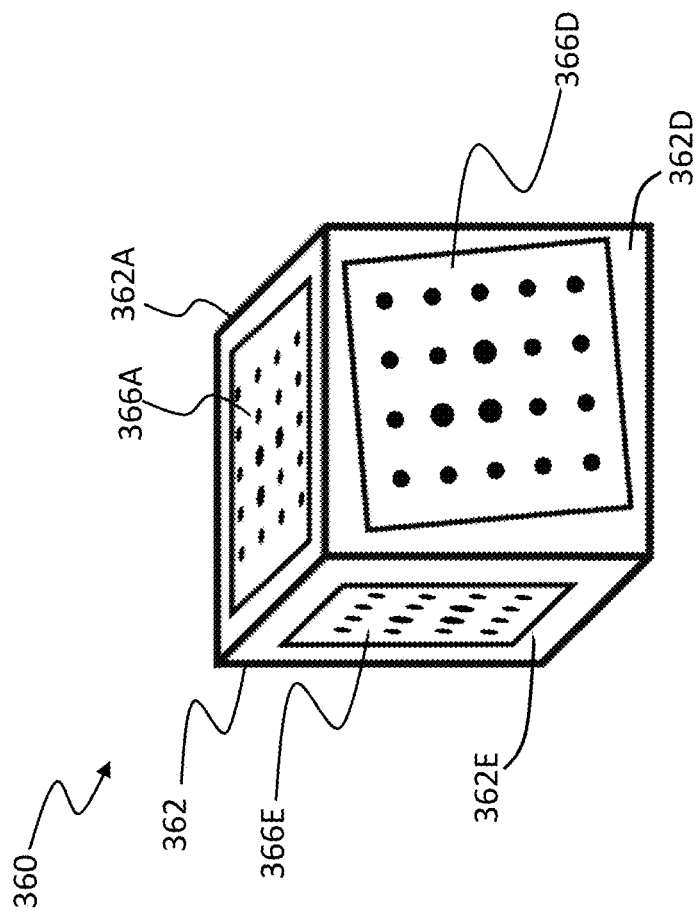

Referring back to step 201 of FIG. 2, the 3D calibration pattern 160/360 in the step may further include a plurality of 2D calibration patterns disposed respectively on the plurality of faces of the polyhedron (e.g., 362) of the 3D calibration pattern 160/360. FIGS. 3D-3F illustrate 2D calibration patterns of the 3D calibration pattern 360. More specifically, FIG. 3D depicts 2D calibration patterns 366A, 366B, and 366C disposed on faces 362A, 362B, and 362C, respectively, of the polyhedron 362. FIG. 3E depicts the polyhedron 362 as viewed along the arrow A in FIG. 3D. More specifically, FIG. 3E depicts 2D calibration patterns 366B, 366E, and 366F disposed on faces 362B, 362E, and 362F, respectively, of the polyhedron 362. FIG. 3F depicts the polyhedron 362 as viewed along the arrow B in FIG. 3D. More specifically, FIG. 3F illustrates 2D calibration patterns 366A, 366D, and 366E disposed on faces 362A, 362D, and 362E, respectively, of the polyhedron 362.

In an embodiment, the 2D calibration patterns 366A-366F of FIGS. 3D-3F may be divided into a first set of 2D calibration patterns 366A-366E and an additional 2D calibration pattern 366F, wherein the first set of 2D calibration patterns 366A-366E are disposed on the first set of faces 362A-362E, respectively, of the polyhedron 362, and wherein the additional 2D calibration pattern 366F is disposed on the additional face 362F of the polyhedron 362. The additional 2D calibration pattern 366F may also be considered to be part of a second set of one or more 2D calibration patterns, wherein there is no 2D calibration pattern in common between the first set of 2D calibration patterns 366A-366E and the second set of one or more 2D calibration patterns (e.g., 366F). In an embodiment, the second set of one or more 2D calibration patterns may include a calibration pattern(s) that is/are not visible to the first camera 370. In the above embodiment, or in another embodiment, the second set of one or more 2D calibration patterns may include a calibration pattern(s) that is/are visible to the second camera 380. In an embodiment, the second set of one or more 2D calibration patterns includes only the 2D calibration pattern 366F. This scenario may occur, for instance, when both the second camera 380 and the 3D calibration pattern 360 are centered relative to the platform 380. In another embodiment, the second set of one or more 2D calibration patterns includes more than one 2D calibration pattern.

In an embodiment, the 2D calibration patterns 366A-366F of the 3D calibration pattern 360 may be disposed on respective faces 362A-366F of the polyhedron 362 in a fixed manner. For instance, each of the 2D calibration patterns 366A-366F may be a flat sheet (e.g., a sticker) or a flat board that is adhered on or otherwise attached to a respective face of the polyhedron 362. In an embodiment, one or more of the 2D calibration patterns 366A-366F may be painted onto respective faces 362A-362F of the polyhedron 362. In an embodiment, any of the 2D calibration patterns 366A-366F may be centered and/or aligned relative to a respective face 362A-362F of the polyhedron 362 (as depicted for 2D calibration pattern 366B in FIGS. 3D and 3E), or may be off-centered and/or misaligned relative to the respective face 362A-362F of the polyhedron 362 (as depicted for 2D calibration pattern 366D in FIG. 3F).

Figure 3G:
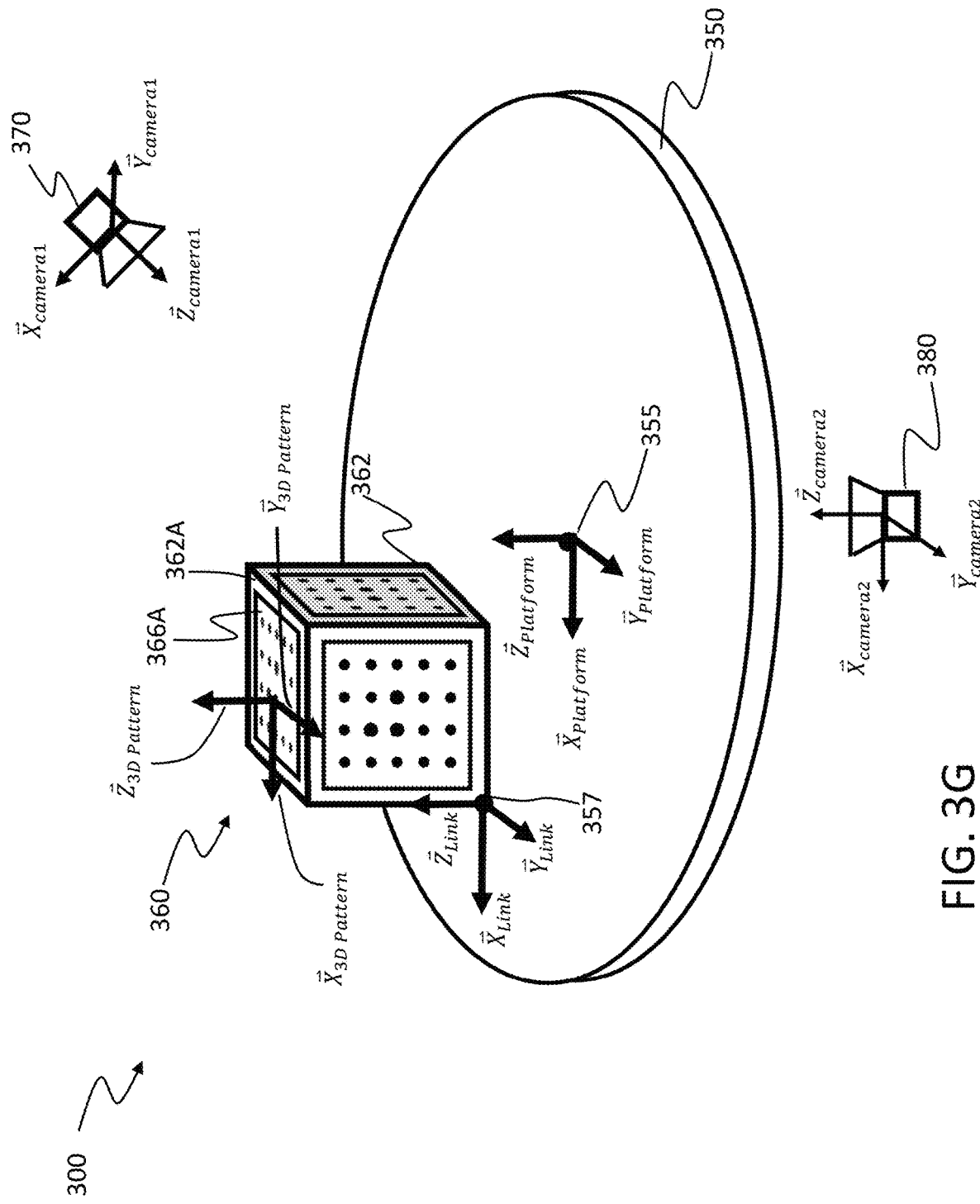
FIGS. 3G and 3H depict various coordinate systems in a scanning system, according to an embodiment herein.

In an embodiment, each 2D calibration pattern of the 2D calibration patterns 366A-366F may have a plurality of pattern elements, such as an array of dots, wherein each of the pattern elements may have a defined location (also referred to as a predefined location) in a coordinate system of the 2D calibration pattern and/or a coordinate system of the 3D calibration pattern 360. FIG. 3G illustrates a coordinate system of the 3D calibration pattern 360, as well as a coordinate system of the platform 350, a coordinate system of the first camera 370, and a coordinate system of the second camera 380. In an embodiment, the coordinate system of the 3D calibration pattern 360 may have coordinate axes $\vec{X}_{3D\,Pattern}, \vec{Y}_{3d\,Pattern}, \vec{Z}_{3D\,Pattern}$ that are aligned with edges of the polyhedron 362. The origin of the coordinate system of the 3D calibration pattern 360 may be a location within the polyhedron 362 (e.g., a center of the polyhedron 362), a location on a surface of the polyhedron 362 (e.g., at a center of the face 362A), or any other location. In an embodiment, as depicted in FIG. 3G, the coordinate system of the platform 350 may have coordinate axes $\vec{X}_{Platform}, \vec{Y}_{Platform}, \vec{Z}_{Platform}$ that are aligned with the central axis 356 of the platform 350 (see FIG. 3A), and have an origin that is located at the center 355 of the platform 350. In some cases, a coordinate system of the first camera 370 or the second camera 380 may have coordinate axes $\vec{X}_{Camera1}, \vec{Y}_{Camera1}, \vec{Z}_{Camera1}$ for the first camera 370, and $\vec{X}_{Camera2}, \vec{Y}_{Camera2}, \vec{Z}_{Camera2}$ for the second camera 380) that are aligned with an optical axis of any lens of the camera 370/380, and may have an origin located at a center of the lens of the camera 370/380, at a center or corner of an image sensor of the camera 370/380, or at some other location. FIG. 3G further illustrates a coordinate system for a link point 357, wherein the coordinate system is defined by coordinate axes $\vec{X}_{Link}, \vec{Y}_{Link}, \vec{Z}_{Link}$. This coordinate system is discussed below in more detail.

Figure 3H:
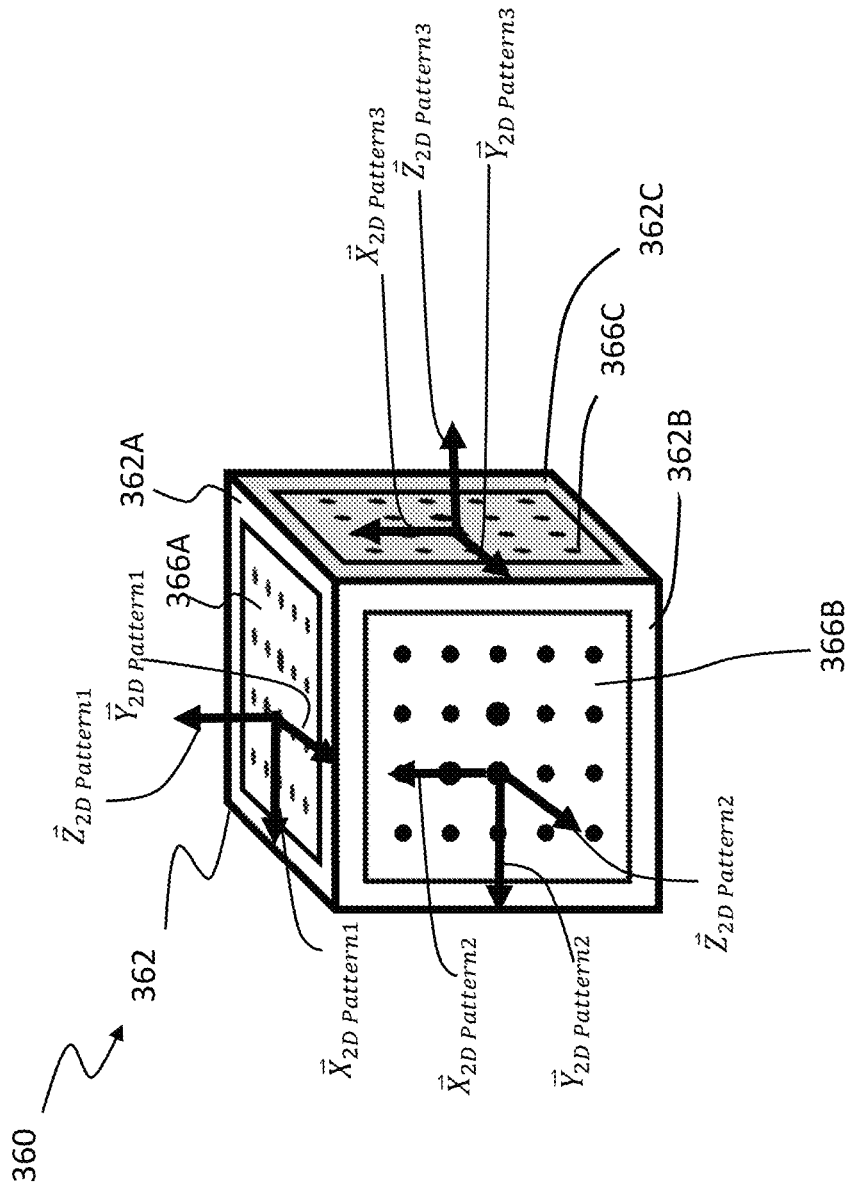

In an embodiment, each of the 2D calibration patterns 366A-366F of the 3D calibration pattern 360 may have its own coordinate system. For instance, FIG. 3H illustrates a first coordinate system for the calibration pattern 366A, wherein the first coordinate system is defined by the coordinate axes $\vec{X}_{2D\,Pattern1}, \vec{Y}_{2D\,Pattern1}, \vec{Z}_{2D\,Pattern1}$. The figure further illustrates a second coordinate system for the calibration pattern 366B, and a third coordinate system for the calibration pattern 366C. The second coordinate system is defined by the coordinate axes $\vec{X}_{2D\,Pattern2}, \vec{Y}_{2D\,Pattern2}, \vec{Z}_{2D\,Pattern2}$, while the third coordinate system is defined by the coordinate axes $\vec{X}_{2D\,Pattern3}, \vec{Y}_{2D\,Pattern3}, \vec{Z}_{2D\,Pattern3}$. Calibration patterns are described in more detail in U.S. patent application Ser. No. 16/295,940, entitled "Method and System for Performing Automatic Camera Calibration for Robot Control," the entire content of which is incorporated herein by reference.

Referring back to step 201 of FIG. 2, the step may involve the control circuit 111 receiving the first set of calibration images from the first camera 170/370 of FIG. 1B or 3A. In an embodiment, the first set of calibration images is acquired or otherwise generated by the first camera 170/370 while the 3D calibration pattern 160/360 is moved to different locations and/or orientations relative to the first camera 170/370. In some cases, the control circuit 111 may control the actuator 140/340 to create such a movement via the platform 150/350. For instance, the control circuit 111 may output one or more motor commands via the communication interface 113 (of FIG. 1C) to the actuator 140/340. The one or more motor commands may cause the actuator 140/340 to rotate the platform 150/350, which moves the 3D calibration pattern 160/360 to have multiple orientations relative to the first camera 170/370. In this example, the first set of calibration images of step 201 are respectively generated when the 3D calibration pattern 160/360 has the multiple orientations relative to the first camera 170/370. In an embodiment, each calibration image of the first set of calibration images may correspond to a different respective location and/or orientation of the 3D calibration pattern 160/360 relative to the first camera 170/370. In other words, as the 3D calibration pattern 160/360 is moved to have various locations and/or orientations relative to the first camera 170/370, the first camera 170/370 generates respective calibration images of the 3D calibration pattern 160/360 while the 3D calibration pattern 160/360 is at the different locations and/or orientations. These calibration images may form the first set of calibration images, which may then be transmitted from the first camera 370 to the control circuit 111 of the computing system 110.

Figure 4A:
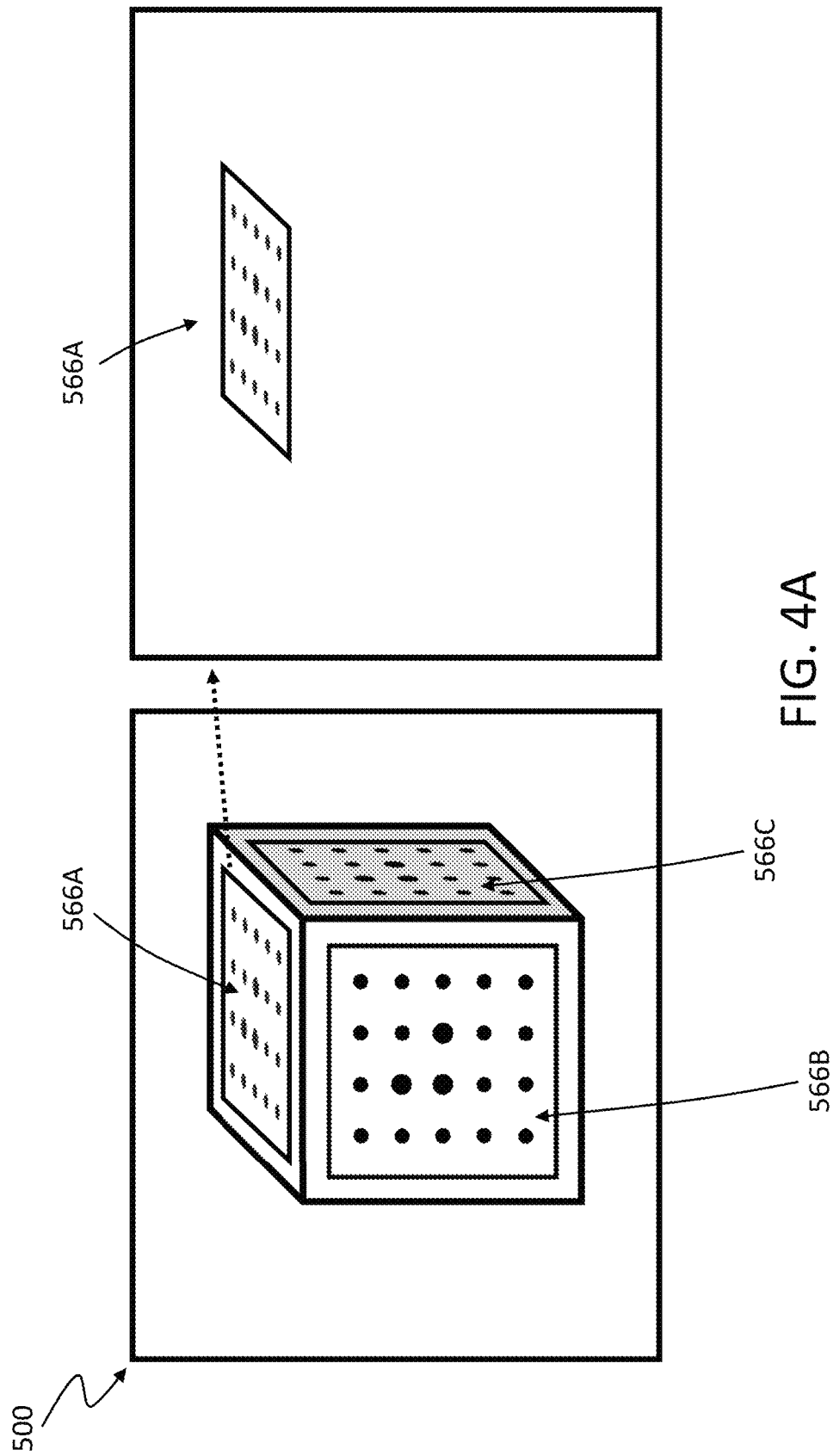

In an embodiment, each calibration image of the first set of calibration images may capture at least two faces of the polyhedron 360 (e.g., the first set of faces 362A-362E) and at least two 2D calibration patterns of the first set of 2D calibration patterns (e.g., the first set of 2D calibration patterns 366A-366E of FIGS. 3D-3F). For instance, each of the first set of calibration images may be generated by the first camera 370 of FIG. 3A, which may have a location and orientation relative to the 3D calibration pattern 360 that allows at least two 2D calibration patterns of the 3D calibration pattern 360 to always be visible to the first camera 370. FIG. 4A depicts an example calibration image 500 that is one of a first set of calibration images of the 3D calibration pattern 360 of FIG. 3A. The example calibration image 500 of FIG. 4A may have a first image portion 566A that captures the 2D calibration pattern 366A and the face 362A of FIGS. 3B and 3D of the polyhedron 362 of FIGS. 3A and 3D. The calibration image 500 may further have a second image portion 566B that captures the 2D calibration pattern 366B and face 362B, both of FIGS. 3B and 3D, and further have a third image portion 566C that captures the 2D calibration pattern 366C and face 362C, both of FIGS. 3B and 3D. In an embodiment, the first set of calibration images does not capture the additional face 362F of the polyhedron 362 of the 3D calibration pattern 360.

In an embodiment, the control circuit 111 of FIG. 1C or 3A may (e.g., as part of step 201 of FIG. 2 or after step 201) extract, from each calibration image of the first set of calibration images, image portions (e.g., 566A, 566B, 566C) which capture respective 2D calibration patterns. For instance, the control circuit 111 may, for each calibration image of the first set of calibration images, extract from the calibration image a first image portion that captures a first 2D calibration pattern, wherein the calibration image may capture at least two 2D calibration patterns. In one example, FIG. 4A illustrates the control circuit 111 extracting the image portion 566A, which captures the 2D calibration pattern 366A (of FIG. 3D), from the calibration image 500. The control circuit 111 may further store information describing pattern elements of the first 2D calibration pattern (e.g., 2D calibration pattern 366A). For example, if the pattern elements are dots, the information that is stored may be pixel coordinates $[u\ v]^T$ of respective locations at which the dots appear in the calibration image 500.

In an embodiment, the control circuit 111 may extract other image portions that represent other 2D calibration patterns in a calibration image, such as image portions 566B and 566C in the calibration image 500 of FIG. 4A. The image portion 566B may capture the 2D calibration pattern 366B, and the image portion 566C may capture the 2D calibration pattern 366C. In some cases, the control circuit 111 may remove, from the calibration image (e.g., calibration image 500), the first image portion that was extracted, so as to facilitate detection of the other image portions, and to reduce a likelihood that any part of the first image portion is mistakenly identified as being part of the other image portions. For instance, the control circuit 111 may generate an updated calibration image by removing the first image portion (e.g., image portion 566A) from the calibration image (e.g., calibration image 500). In some cases, the removal may be done by blacking out the first image portion. As an example, FIG. 4B depicts an updated calibration image 530 in which the first image portion 566A is blacked out, so as to replace the first image portion 566A with a first blacked-out portion 534, which corresponds to the first image portion 566A. In some cases, blacking out the first image portion 566A may involve setting all pixels of the first image portion 566A to have a predefined intensity value (e.g., zero).

In an embodiment, the control circuit 111 may extract, from the updated calibration image (e.g., updated calibration image 530 of FIG. 4B) a second image portion (e.g., image portion 566C), also referred to as another image portion, that captures a second 2D calibration pattern (e.g., calibration pattern 366C of FIG. 3D), and may store information describing pattern elements of the second 2D calibration pattern. The stored information may include, e.g., pixel coordinates $[u\ v]^T$ of respective locations at which pattern elements of the second 2D calibration pattern appear in the updated calibration image (e.g., updated calibration image 530).

Figure 4C:
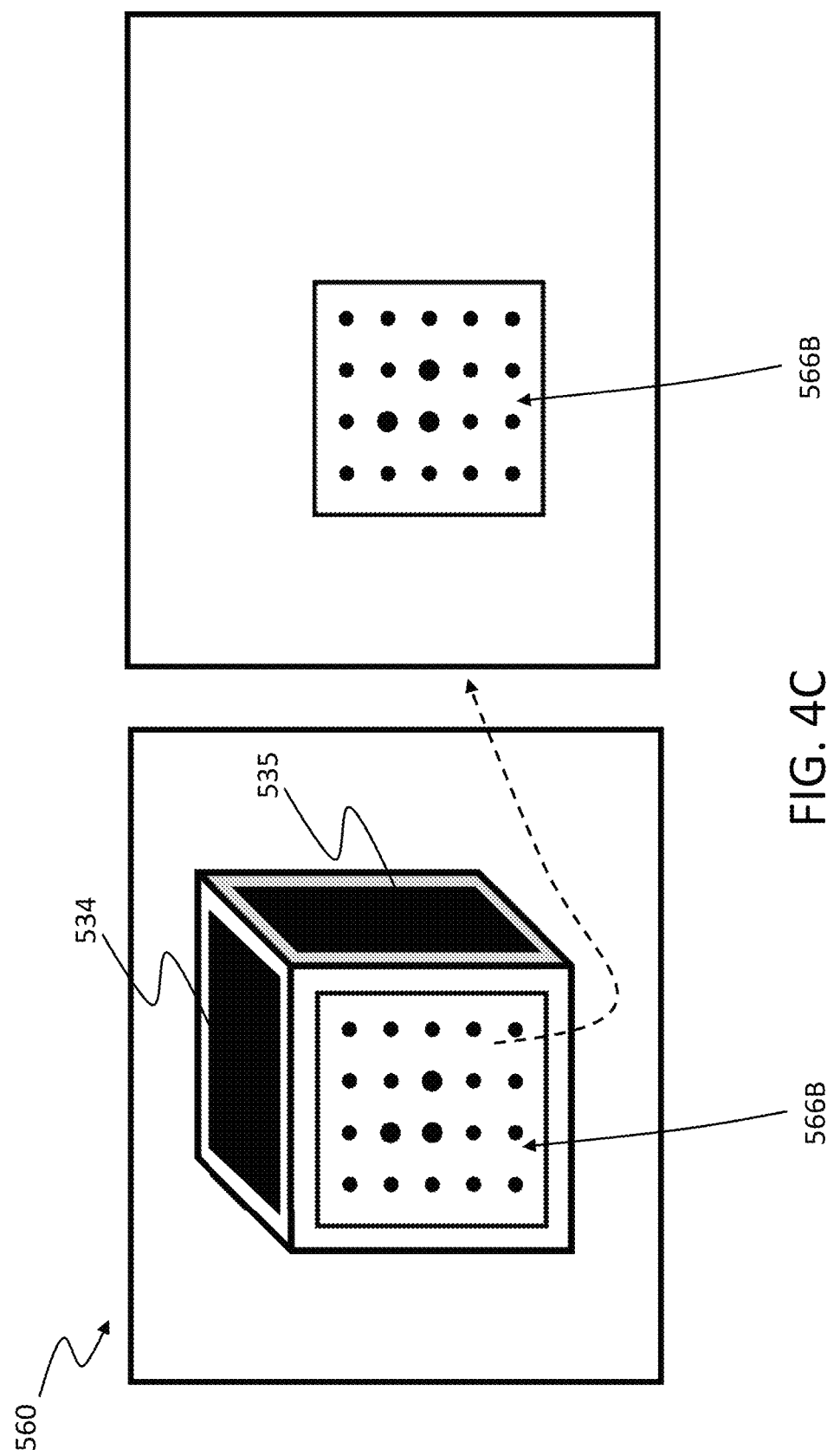

In an embodiment, the control circuit 111 may remove (e.g., black out) the second image portion (e.g., 566C) and other image portions that capture a 2D calibration pattern, until all but one of such image portions are removed from the calibration image 500. For instance, FIG. 4C depicts the control circuit 111 generating an additional updated calibration image 560 by further removing the second image portion 566C from the updated calibration image 530. The removal may be performed by replacing the second image portion 566C in the updated calibration image 560 with a second blacked-out portion 535, which corresponds to the second image portion 566C. The control circuit 111 may extract, from the additional updated calibration image 560, a third image portion 566B that captures the third 2D calibration pattern 366B of the three 2D calibration patterns 366A-366C represented in the calibration image 500 of FIG. 4A. The control circuit 111 may further store information describing pattern elements of the third 2D calibration pattern 366B.

In an embodiment, the control circuit 111 may determine an estimate of a calibration parameter of the first camera 170/370 of FIGS. 1B, 1D, 1E, and/or 3A, based on the first set of calibration images received in step 201 of FIG. 2. For instance, this determination may be based on stored information describing pattern elements of a first 2D calibration pattern and pattern elements of a second 2D calibration pattern captured by the first set of calibration images. In some cases, the calibration parameter may be an intrinsic calibration parameter, such as a projection matrix K that describes image projection onto an image sensor of the first camera 170/370, or a distortion parameter that describes lens distortion or any other form of distortion experienced by the first camera 170/370. In such an example, the determination may be part of an intrinsic camera calibration performed by the control circuit 111. In some cases, the calibration parameter may be a transformation function that describes a spatial relationship between the first camera 170/370 and a particular 2D calibration pattern of the 3D calibration pattern 160/360, or more generally a spatial relationship between the first camera 170/370 and the 3D calibration pattern 160/360 of FIG. 1E and/or 3A-3F. For instance, the transformation function may be a matrix $T_{Camera\ N}^{2D\ Pattern\ M}$ that describes a linear transformation (e.g., a rotation and translation) between a coordinate system of Camera N (e.g., the first camera 370) and a coordinate system of a 2D calibration pattern M (e.g., any of the first set of 2D calibration patterns 366A-366E). As a more specific example, the control circuit 111 may determine an estimate of a projection matrix $K_{Camera\ 1}$ for the first camera 170/370, respective estimates of a plurality of distortion parameters for the first camera 170/370, and matrices $T_{Camera\ 1}^{2D\ Pattern\ 1}$, $T_{Camera\ 1}^{2D\ Pattern\ 2}$, $T_{Camera\ 1}^{2D\ Pattern\ 3}$, $T_{Camera\ 1}^{2D\ Pattern\ 4}$, and $T_{Camera\ 1}^{2D\ Pattern\ 5}$. In the above example, Camera 1 may refer to the first camera 370, while 2D patterns 1 through 5 may refer to the 2D calibration patterns 366A through 366E, respectively. In an embodiment, the control circuit 111 may determine an estimate of the intrinsic calibration parameter and/or an estimate of the transformation function based on stored information describing pattern elements (e.g., dots) of the first set of 2D calibration patterns (e.g., 366A-366E) of the 3D calibration pattern 160/360. For instance, the determination may be based on pixel coordinates that describe where the pattern elements appear in the first set of calibration images, and based on defined locations for the pattern elements in a coordinate system of the 3D calibration pattern 160/360, or a coordinate system of one of the 2D calibration patterns 366A-366F. The determination may use, e.g., the Perspective-n-Point algorithm, the algorithm described in "*A Flexible New Technique for Camera Calibration*," Technical Report MSR-TR-98-71, by Zhengyou Zhang (also referred to as Zhang's algorithm), any other algorithm, or a combination thereof. Determining an estimate of a calibration parameter based on a calibration image is described in more detail in U.S. patent application Ser. No. 16/295,940, entitled "Method and System for Performing Automatic Camera Calibration for Robot Control," the entire content of which is incorporated herein by reference.

In an embodiment, the calibration parameter that is estimated may be a transformation function that describes a spatial relationship between the first camera 170/370 and the platform 150/350 of FIG. 1B, 1D, 1E, and/or 3A, or more specifically between the first camera 170/370 and a center 355 of FIG. 3A of the platform 150/350. For instance, the transformation function may be a matrix $T_{PLATFORM}^{CAMERA\ 1}$ that describes a linear transformation between a coordinate system of the first camera 170/370 and a coordinate system of the platform 150/350. In some cases, the center 355 of the platform 150/350 may be treated as a world point, and $T_{PLATFORM}^{CAMERA\ 1}$ may describe a relationship between the first camera 170/370 and the world point. In some cases, determining an estimate of the calibration parameter may be part of a hand-eye calibration phase. For instance, the hand-eye calibration phase may involve solving for $T_{PLATFORM}^{CAMERA\ 1}$ based on the equation:

$$T_{PLATFORM}^{LINK} T_{LINK}^{3D\ PATTERN} = T_{PLATFORM}^{CAMERA\ 1} T_{CAMERA\ 1}^{3D\ PATTERN} \quad \text{Equation 1}$$

In this example, $T_{PLATFORM}^{LINK}$ may be a transformation function that describes a spatial relationship between a coordinate system of the platform 150/350 and a coordinate system of a link point, such as the link point 357 of FIG. 3G. In an embodiment, the link point 357 may be any point on the platform 350, other than the center 355 of the platform 350. In some cases, the link point 357 may be a point that is stationary relative to the 3D calibration pattern 360. In an embodiment, the link point 357 may be any point on the platform 350 that is in contact with the 3D calibration pattern 360. In this example, $T_{PLATFORM}^{LINK}$ may be determined by the control circuit 111 based on an amount by which the actuator 340 (of FIG. 3A) has rotated or otherwise actuated the platform 350. For instance, $T_{PLATFORM}^{LINK}$ may include a rotation matrix that describes the amount of rotation (e.g., a rotation of 60° or 100°) experienced by the link point 357 relative to a defined initial position.

In the above example, $T_{CAMERA\ 1}^{3D\ PATTERN}$ be a matrix that defines a spatial relationship between a coordinate system of the 3D calibration pattern 160/360 and the first camera 170/370, and may have been determined based on one of the algorithms described above, such as the Perspective-n-Point algorithm or Zhang's algorithm. Further, $T_{LINK}^{3D\ PATTERN}$ may be a matrix that describes a spatial relationship between a coordinate system of the 3D calibration pattern 160/360 and the link point 357, while $T_{PLATFORM}^{CAMERA\ 1}$ ink may be a matrix that describes a spatial relationship between a coordinate system of the first camera 170/370 and a coordinate system of the platform 150/350. The above example may involve a hand-eye calibration operation that solves for $T_{PLATFORM}^{CAMERA\ 1}$ and $T_{LINK}^{3D\ PATTERN}$ based on Equation 1. Hand-eye calibration and solving Equation 1 is described in more detail in U.S. patent application Ser. No. 16/295,940, entitled "Method and System for Performing Automatic Camera Calibration for Robot Control," the entire content of which is incorporated herein by reference in its entirety.

Returning to FIG. 2, the method 200 may further include a step 203, in which the control circuit 111 may receive a second set of one or more calibration images via the communication interface 113 (of FIG. 1C) from the second camera 180/380. The second set of one or more calibration images may capture an additional face of the polyhedron, such as the face 362F of FIG. 3C/3E (e.g., bottom face) of the polyhedron 362 of FIGS. 3B-3F. The additional face (e.g., face 362F) may be a face at which the second camera 180/380 is pointed, and/or may be a face of the polyhedron 360 that is in direct contact with the platform 150/350 (e.g., with the first surface 352 of the platform 350). Further, the second set of one or more calibration images may capture the additional 2D calibration pattern (e.g., 2D calibration pattern 366F) disposed on the additional face, or capture an outline of the additional face (also referred to as a contour or silhouette of the additional face).

In an embodiment, the second set of one or more calibration images may include at least one pair of calibration images that were acquired by the second camera 180/380 with different respective lighting conditions. The at least one pair of calibration images may include a first calibration image acquired by the second camera 180/380 with a first lighting condition and a second calibration image acquired by the second camera 180/380 with a second lighting condition different than the first lighting condition, wherein both the first calibration image and the second calibration image are generated for a same location and/or pose of the 3D calibration pattern 160/360 on the platform 150/350. More specifically, the 3D calibration pattern 160/360 may have remained stationary relative to the second camera 180/380 between when the first calibration image of the at least one pair of calibration images is acquired and when the second calibration image of the at least one pair of calibration images is acquired. In some cases, the second set of one or more calibration images may include multiple pairs of calibration images, wherein each pair includes a respective first calibration image acquired by the second camera 180/380 with the first lighting condition, and includes a respective second calibration image acquired by the second camera 180/380 with the second lighting condition.

In an embodiment, the first lighting condition is a back-lighting condition in which the 3D calibration pattern 160/360 is backlit from the point of view of the second camera 180/380. The back-lighting condition may be created by, e.g., activating the first light source 120/320. Because the 3D calibration pattern 160/360 is disposed between the second camera 180/380 and the first light source 120/320, the 3D calibration pattern 160/360 may be considered to be backlit from the point of view of the second camera 180/380. In such an embodiment, the first calibration image of the at least one pair of calibration images may be referred to as a respective backlit calibration image of the pair. In some cases, the first lighting condition may further involve the second light source 130/330 being deactivated. In some cases, as discussed below in more detail, the backlit calibration image may capture a silhouette of the additional face (e.g., 362F) of the polyhedron (e.g., 362) of the 3D calibration pattern 160/360.

In an embodiment, the second lighting condition is a front-lighting condition in which the 3D calibration pattern 160/360 is front-lit from the point of view of the second camera 180/380. The front-lighting condition may be created by, e.g., activating the second light source 130/330. Because the second light source 130/330 may directly illuminate the additional face (e.g., 362F) of the polyhedron of the 3D calibration pattern 160/360 (or any other face of the polyhedron that is visible to the second camera 180/380), the 3D calibration pattern 160/360 may be considered to be front-lit from the point of view of the second camera 180/380. In such an embodiment, the second calibration image of the at least one pair of calibration images may be referred to as a respective front-lit calibration image of the pair. In some cases, the second lighting condition may further involve the first light source 120/320 being deactivated. In some cases, as discussed below in more detail, the front-lit calibration image may capture the 2D calibration pattern (e.g., 366F) disposed on the additional face (e.g., 362F) of the polyhedron of the 3D calibration pattern 160/360. In an embodiment, the second set of one or more calibration images may include multiple pairs of images, wherein each pair includes a respective backlit calibration image and a respective front-lit calibration image. As an example of the at least one pair of calibration images, FIGS. 5A and 5B illustrate a pair of a first calibration image 400 (e.g., a backlit calibration image) acquired by the second camera 180/380 with a first lighting condition and a second calibration image 450 (e.g., a front-lit calibration image) acquired by the second camera 180/380 with a second lighting condition.

In some instances, acquiring both the respective first calibration image 400 of the pair and the respective second calibration image 450 of the pair with the second camera 180/380 of FIGS. 1B, 1D, 1E and/or 3A may compensate against sources of imaging error. For example, a transparent material (e.g., glass) of the platform 150/350 of FIGS. 1D-1E/3A may bend or otherwise distort light that passes through the material to the second camera 180/380. This distortion may be a source of imaging error, and may reduce an ability of the control circuit 111 of FIGS. 1C/3A to, e.g., accurately identify a feature of the 3D calibration pattern 160/360 of FIGS. 1E/3A, such as locations of bottom corners of a polyhedron (e.g., polyhedron 362 of FIG. 3A) of the 3D calibration pattern 160/360. In some cases, the respective second calibration image 450 (e.g., front-lit calibration image) of the pair may contain information that can be used to compensate against distortion or other imaging error that may be present in the respective first calibration image 400 (e.g., backlit calibration image) of the pair, and vice versa, because the two calibration images 400/450 are acquired with different lighting conditions. For instance, as discussed in more detail below, the control circuit 111 may be configured to use both the respective first calibration image 400 and the respective second calibration image 450 of a pair of calibration images acquired by the second camera 180/380 to determine coordinates for corner locations of the additional face (e.g., face 362F of FIG. 3E) of the polyhedron of the 3D calibration pattern 160/360.

In an embodiment, the respective first calibration image 400 of a pair of calibration images acquired by the second camera 180/380 may capture a silhouette 412 of the additional face (e.g., 362F) of the polyhedron (e.g., 362) of the 3D calibration pattern (e.g., 360), and may be generated with a back-lighting condition, as stated above. In one example, the back-lighting condition may be created by activating the first light source 120/320 (e.g., a top LED) of FIGS. 1B and 3A, and deactivating the second light source 130/330 (e.g., a bottom LED) of FIGS. 1B and 3A. For instance, the control circuit 111 may output via the communication interface 113 of FIG. 1C a first set of one or more light source commands to the first light source 120/320 and to the second light source 130/330 for causing the first light source 120/320 to be activated and the second light source 130/330 to be deactivated. The second light source 130/330 may be pointed at or toward the additional face (e.g., face 362F) of the polyhedron (e.g., polyhedron 362), while the first light source 120/320 may be considered to be located behind (e.g., with respect to a point of view of the second light source 130/330 or point of view of the second camera 180/380) the additional face. In this embodiment, the control circuit 111 may further output via the communication interface 113 a first set of one or more camera commands to the second camera 180/380 for causing the second camera 180/380 to generate the first calibration image 400 (of FIG. 5A) of the at least one pair of calibration images while the first light source 120/320 is activated and the second light source 130/330 is deactivated, wherein the at least one pair of calibration images is part of the second set of one or more calibration images acquired or otherwise generated by the second camera 180/380. In the above embodiment, because the second light source 130/330 is deactivated, no light is provided to the second surface 154/354 of FIGS. 1B, 1D-1E/3A (e.g., bottom surface) of the platform 150/350 of FIG. 1B or 3A, nor to the additional face (e.g., face 362F) of the polyhedron (e.g., 362) of the calibration pattern 160/360. Thus, the additional face of the polyhedron may appear dark in the first calibration image (e.g., 400) of the pair of calibration images. Further, the 3D calibration pattern 160/360 may eclipse or obscure the first light source 120/320, or more generally partially or fully block the second camera 180/380 from the first light source 120/320 which is activated. Such a condition may further accentuate the silhouette 412 of the additional face (e.g., 362F) of the polyhedron of the 3D calibration pattern 160/360.

Figure 5B:
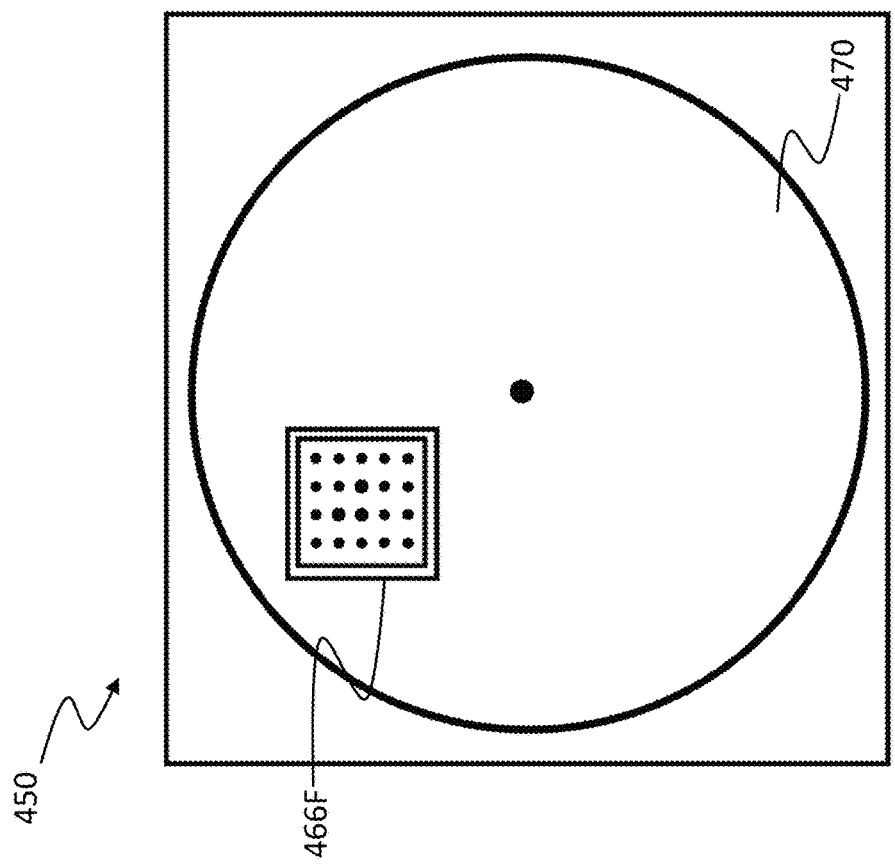
Figure 5A:
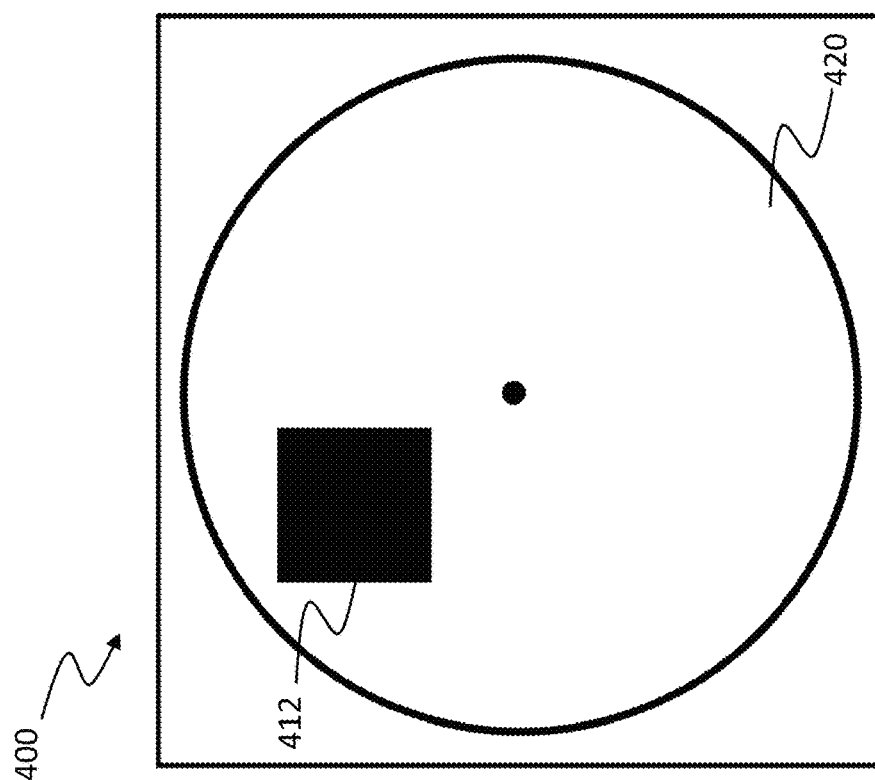

In an embodiment, the second calibration image 450 of FIG. 5B may be generated while there is a front-lighting condition, as discussed above. In one example, the front-lighting condition may be created when the first light source 120/320 (e.g., top LED) of FIG. 1B or 3A is deactivated, and the second light source 130/330 (e.g., bottom LED) is activated. For instance, the control circuit 111 may output via the communication interface 113 a second set of one or more light source commands to the first light source 120/320 and to the second light source 130/330 for causing the second light source 120/320 to be activated. In some instances, the second set of one or more light source commands may also cause the first light source 120/320 to be deactivated. The control circuit 111 may further output via the communication interface 113 a second set of one or more camera commands to the second camera 180/320 for causing the second camera 180/380 to generate the second calibration image 450 of the at least one pair of calibration images while the second light source 130/330 is activated and the first light source 120/320 is deactivated, wherein the at least one pair of calibration images is part of the second set of one or more calibration images acquired by the second camera 180/380. As depicted in FIG. 5B, the second calibration image 450 may have an image portion 466F that captures an additional 2D calibration pattern (e.g., 2D calibration pattern 366F of FIG. 3E) of the plurality of 2D calibration patterns (e.g., 366A-366F) of the 3D calibration pattern 160/360, wherein the additional 2D calibration pattern is disposed on the additional face (e.g., face 362F) of the polyhedron of the 3D calibration pattern 160/360.

FIGS. 5A and 5B depict an embodiment in which the second set of calibration images in step 203 may capture only the additional face (e.g., face 362F) of the polyhedron of the 3D calibration pattern, and do not capture any of the first set of faces (e.g., faces 366A-366E) of the polyhedron. The additional face may be a face which is directly contacting the platform 150/350. In other embodiments, the second set of calibration images may also capture one or more of the first set of faces (e.g., face 366C or 366E in FIGS. 3D and 3E) of the polyhedron of the 3D calibration pattern. For instance, the second camera 180/380 may be able to view one or more of the first set of faces at an angle, and generate calibration images that capture the one or more of the first set of faces (in addition to capturing the additional face 362F). However, because the second camera 180/380 is viewing the one or more of the first set of faces (e.g., face 362C) through a transparent material of the platform 150/350, the transparent material may introduce distortion into how the first set of faces appear in the second set of one or more calibration images, especially if the second camera 180/380 is not viewing the first set of faces head-on. Thus, the control circuit 111 may in some implementations remove, from the second set of one or more calibration images, image portions that capture any of the first set of faces (e.g., faces 362C, 362E) of the polyhedron. In some implementations, the control circuit 111 may simply ignore image portions of the second set of one or more calibration images that capture any of the first set of faces.

In an embodiment, the control circuit 111 may be configured to determine an estimate of a calibration parameter for the second camera 170/380 based on the second set of one or more calibration images. For instance, the control circuit 111 may be configured to perform intrinsic calibration for the second camera 180/380 so as to determine an estimate of an intrinsic calibration parameter, such as a projection matrix $K_{Camera2}$ or a distortion parameter, for the second camera 180/380. In some cases, the calibration parameter may include a transformation function $T_{Camera\ 2}^{2D\ Pattern\ 6}$ wherein 2D Pattern 6 may refer to, e.g., the additional 3D calibration pattern 366F, and wherein Camera 2 may refer to the second camera 380. In an embodiment, the estimate of the intrinsic calibration parameter or of $T_{Camera\ 2}^{2D\ Pattern\ 6}$ may be determined based on pattern elements (e.g., dots) of the additional 2D calibration pattern (e.g., 2D calibration pattern 366F) that appear in the calibration image 450 or in any other calibration image of the second set of one or more calibration images in which the pattern elements appear. The estimation may be performed in a manner similar to that for the first camera 170/370.

In an embodiment, each of the first set of calibration images generated by the first camera 170/370 for step 201 may each correspond with at least one of the second set of calibration images generated by the second camera 180/380 for step 203, or vice versa. In some cases, a calibration image of the first set of calibration images may be considered to correspond with a calibration image of the second set of one or more calibration images if the 3D calibration pattern 160/360 remained stationary relative to the first camera 170/370 and relative to the second camera 180/380 in a time period between when the calibration image of the first set of calibration images was generated and when the calibration image of the second set of one or more calibration images was generated. In some cases, a calibration image acquired or otherwise generated by the first camera 170/370 may be considered to correspond with a calibration image acquired or otherwise generated by the second camera 180/380 if the two calibration images were acquired or otherwise generated while the 3D calibration pattern 160/360 was at a same location and/or pose on the platform 150/350 for both calibration images.

Returning to FIG. 2, the method 200 may further include steps 205-209, in which the control circuit 111 may determine coordinates of a set of corners of the polyhedron (e.g., polyhedron 362) of the 3D calibration pattern 160/360. The control circuit 111 may determine a set of coordinates for these corners relative to the first camera 170/370 (e.g., in a coordinate system of the first camera 170/370), and determine a set of coordinates for the same corners relative to the second camera 180/380 (e.g., in a coordinate system of the second camera 180/380). In some cases, the control circuit 111 may use the two sets of coordinates to determine a spatial relationship between the first camera 170/370 and the second camera 180/380. The spatial relationship may describe a location and/or orientation of the first camera 170/370 relative to the second camera 180/380 or vice versa. In one example, the spatial relationship may be expressed as a matrix $T_{Camera\ 1}^{Camera\ 2}$, which expresses a linear transformation between a coordinate system of the first camera 170/370 (which is labeled as Camera 1) and a coordinate system of the second camera 180/380 (which is labeled as Camera 2).

More specifically, in step 205, the control circuit 111 may determine, based on the first set of 2D calibration patterns (e.g., 2D calibration patterns 366A-366E), a first set of coordinates for representing a set of respective corners of the additional face (e.g., face 362F) of the polyhedron (e.g., polyhedron 362) relative to a location and orientation of the first camera 170/370. For instance, the set of respective corners may be a set of four corners 364a-364d of the face 362F, as depicted in FIG. 3C. In some cases, this set of respective corners 364a-364d may be bottom corners of the polyhedron 362 of the 3D calibration pattern 360. In some cases, the first set of coordinates may be in a coordinate system of the first camera 170/370. In an embodiment, the set of respective corners may always be visible to the second camera 180/380 because they are corners of, e.g., a bottom face of a polyhedron (e.g., polyhedron 362) of the 3D calibration pattern 160/360, whereas one or more of the set of respective corners may sometimes not be visible to the first camera 170/370. In an embodiment, the control circuit 111 may perform step 205 for each calibration image of the first set of calibration images received in step 201, wherein the step 205 may be performed based on the 2D calibration patterns and the pattern elements captured in the calibration image.

In some cases, the control circuit 111 may use defined information (also referred to as predefined information) regarding a geometry of the 3D calibration pattern 160/360 to determine the first set of coordinates. For instance, step 205 may involve determining a 3D model of the polyhedron (e.g., polyhedron 362) based on the first set of 2D calibration patterns (e.g., 366A-366E) in the first set of calibration images. In such an embodiment, the first set of coordinates for the set of respective corners (e.g., corners 364a-364d) of the additional face of the polyhedron may be determined based on the 3D model of the polyhedron (e.g., polyhedron 362). In an embodiment, the 3D model of the polyhedron may describe a three-dimensional structure of the polyhedron. For instance, the 3D model may describe a spatial relationship between faces of the polyhedron. In some cases, the spatial relationship between two or more faces of the polyhedron may be expressed as a transformation function, such as a matrix.

As an example of generating and using the 3D model of the polyhedron of the 3D calibration pattern, the control circuit 111 may determine, based on the first set of 2D calibration patterns (e.g., 362A-362E), information describing respective imaginary planes formed by the first set of faces (e.g., 362A-362E) of the polyhedron (e.g., polyhedron 362). In this example, the 3D model of the polyhedron may be represented by at least the information describing the respective imaginary planes. In some cases, the control circuit 111 may determine a coordinate of a corner of the polyhedron, such as a corner of a top face of the polyhedron (e.g., face 362A in FIG. 3B), as an intersection of three imaginary planes that correspond to three respective faces of the polyhedron (e.g., face 362A, face 362B, and face 362C of the polyhedron 362). The intersection may also be referred to as a location where at least three of the respective imaginary planes intersect. In some cases, the 3D model of the polyhedron may further include a defined value of a dimension of the polyhedron. Because the dimension (e.g., size) of the polyhedron of the calibration pattern 160/360 has a defined value, which may be stored or otherwise accessible by the control circuit 111, the control circuit 111 may use the defined dimension to further determine a coordinate of another corner of the polyhedron, such as a corner of a bottom face of the polyhedron, as discussed below in more detail.

In an embodiment, the control circuit 111 may determine information describing the respective imaginary planes based on a relationship between the first set of faces (e.g., faces 366A-366E) of the polyhedron (e.g., polyhedron 362). As an example, the 3D calibration pattern 360 of FIG. 3A may be defined by six imaginary planes that define respective orientations of the six faces 362A-362F of the polyhedron 362 of the 3D calibration pattern 360. The six imaginary planes may be co-planar with the six faces 362A-362F, respectively. In an embodiment, the control circuit 111 may be configured to identify a particular imaginary plane based on pattern elements of a 2D calibration pattern disposed on a face corresponding to the imaginary plane. For instance, the control circuit 111 may be configured to identify an imaginary plane defined by the face 362A of the polyhedron 362 of FIG. 3D based on locations of at least three dots of the 2D calibration pattern 366A disposed on the face 362A, wherein the at least three dots are not co-linear. More specifically, the control circuit 111 may be configured to determine information which identifies the imaginary plane defined by the face 362A. The information may have the form of, e.g., a vector normal to the imaginary plane, an equation representing the plane (e.g., ax+by +cz=0), or some other form of information. The control circuit 111 may be configured to determine this information based on the respective locations of the at least three dots of the 2D calibration pattern 366A. Similarly, the control circuit 111 may be configured to identify respective imaginary planes defined by one or more of the faces 362B-362E based on locations of pattern elements of the 2D calibration patterns 366B-366E.

As stated above, the control circuit 111 may determine a spatial relationship between the first set of faces (e.g., faces 366A-366E) of the polyhedron. In such an embodiment, the information describing the respective imaginary planes may be based on a spatial relationship between the first set of faces (e.g., faces 366A-366E) of the polyhedron (e.g., polyhedron 362). In an embodiment, the spatial relationship between the first set of faces may be expressed as a transformation function $T_{2D\ Pattern\ N}^{2D\ Pattern\ M}$, wherein the 2D pattern M is one of the first set of 2D calibration patterns (e.g., one of the first set of 2D calibration patterns 366A-366E), and 2D pattern N is another one of the first set of 2D calibration patterns. For instance, $T_{2D\ Pattern\ 2}^{2D\ Pattern\ 1}$ may describe a 90 degree rotation between an imaginary plane formed by the 2D calibration pattern 362A and an imaginary plane formed by the 2D calibration pattern 362B, wherein 2D pattern 1 refers to the 2D calibration pattern 366A of FIG. 3D, and 2D pattern 2 refers to the 2D calibration pattern 366B of FIG. 3D. This spatial relationship described by the transformation function may be used so as to express information for the imaginary planes in a common coordinate system. As an example, of determining $T_{2D\ Pattern\ 2}^{2D\ Pattern\ 1}$, the control circuit 111 may determine $T_{2D\ Pattern\ 2}^{2D\ Pattern\ 1}$ based on $T_{Camera\ 1}^{2D\ Pattern\ 1}$ and $T_{Camera\ 1}^{2D\ Pattern\ 2}$. The determination of $T_{Camera\ 1}^{2D\ Pattern\ 1}$ and $T_{Camera\ 1}^{2D\ Pattern\ 2}$ is described above. In one example, this determination of $T_{Camera\ 1}^{2D\ Pattern\ 1}$ and $T_{Camera\ 1}^{2D\ Pattern\ 2}$ may involve solving the equation:

$$\begin{bmatrix} u \\ v \\ 1 \end{bmatrix} = k_{Camera1} T_{Camera1}^{2DPatternN} \begin{bmatrix} x \\ y \\ z \\ 1 \end{bmatrix}_{2DPatternN} \quad \text{Equation 2}$$

In the above equation, [u, v] may refer to a pixel coordinate at which a pattern element of 2D calibration pattern N (e.g., 366A or 366B) appears in a calibration image, and $k_{Camera1}$ may be a projection matrix of the first camera 170/370. The calibration image may be one of the first set of calibration images received in step 201. Further, the coordinate [x, y, z] may be a defined coordinate of that pattern element in a coordinate system of the 2D calibration pattern N (also referred to as a pattern coordinate system of the 2D calibration pattern N). As stated above, $T_{Camera\ 1}^{2D\ Pattern\ 1}$ and $T_{Camera\ 1}^{2D\ Pattern\ 2}$ may be determined so as to determine a spatial relationship between the 2D calibration pattern 366A (labeled as 2D Pattern 1) and 2D calibration pattern 366B (labeled as 2D Pattern 2). In one example, the spatial relationship between the 2D calibration pattern 366A and the 2D calibration pattern 366B may be determined based on the equation:

$$T_{2D\ Pattern2}^{Camera\ 1} T_{Camera\ 1}^{2D\ Pattern1} = T_{2D\ Pattern2}^{2D\ Pattern1} \quad \text{Equation 3}$$

In the above example, the transformation function $T_{2D\ Pattern\_2}^{2D\ Pattern\_1}$ further describe a spatial relationship between the face 362A and the face 362B of the polyhedron 362 of FIG. 3D, because the 2D calibration pattern 366A is disposed on the face 362A, and the 2D calibration pattern 366B is disposed on the face 362B. In one example, as stated above, $T_{2D\ Pattern\_2}^{2D\ Pattern\_1}$ may describe a 90 degree rotation between the face 362A and the face 362B. In an embodiment, the control circuit 111 may further, in a similar manner as described above, determine one or more of $T_{2D\ Pattern\_3}^{2D\ Pattern\_1}$, $T_{2D\ Pattern\_4}^{2D\ Pattern\_1}$, $T_{2D\ Pattern\_5}^{2D\ Pattern\_1}$ (wherein 2D patterns 3, 4, and 5 refer to the 2D calibration patterns 366C-366E, respectively) or determine a transformation function between some other combination of 2D calibration patterns.

In an embodiment, the control circuit 111 may use the spatial relationship between the first set of faces (e.g., faces 366A-366E) of the polyhedron (e.g., polyhedron 362) to determine a set of coordinates for a first set of corners (e.g., top corners) of the polyhedron. These coordinates may be used to determine coordinates for other corners (e.g., bottom corners) of the polyhedron. For instance, the spatial relationship may be described by a transformation function, such as by $T_{2D\ Pattern\_2}^{2D\ Pattern\_1}$ and $T_{2D\ Pattern\_3}^{2D\ Pattern\_1}$, and the first set of corners may be corners of the face 362A of the polyhedron 362 of FIG. 3D. In this example, the control circuit 111 may determine information that identifies a first imaginary plane defined by the face 362A, determine information which identifies a second imaginary plane defined by the face 362B, and determine information which identifies a third imaginary plane defined by the face 362C of FIG. 3D, as described above. In an embodiment, the control circuit may use $T_{2D\ Pattern\_2}^{2D\ Pattern\_1}$ and $T_{2D\ Pattern\_3}^{2D\ Pattern\_1}$ so as to express the above information in a common coordinate system, such as a coordinate system of Pattern 1, which is the 2D calibration pattern 366A. More specifically, when the control circuit 111 determines the information which identifies the secondary imaginary plane, this information may initially be expressed relative to a coordinate system of Pattern 2, which is the 2D calibration pattern 366B disposed on the face 362B. Similarly, when the control circuit 111 determines the information which identifies the third imaginary plane, this information may initially be expressed relative to a coordinate system of Pattern 3, which is the 2D calibration pattern 366C disposed on the face 362C. The control circuit 111 may apply (e.g., multiply) $T_{2D\ Pattern\_2}^{2D\ Pattern\_1}$, or an inverse thereof, to the information which identifies the second imaginary plane, so as to convert the information (e.g., a normal vector or an equation describing the imaginary plane) from being expressed in the coordinate system of the 2D calibration pattern 366B to being in the coordinate system of the 2D calibration pattern 366A. The control circuit 111 may further apply $T_{2D\ Pattern\_3}^{2D\ Pattern\_1}$, or an inverse thereof, to the information identifying the third imaginary plane, so as to convert the information from being expressed in the coordinate system of the 2D calibration pattern 366C to being in the coordinate system of the 2D calibration pattern 366A.

In an embodiment, after the information which identifies the first imaginary plane, the second imaginary plane, and the third imaginary plane are expressed relative to a common coordinate system, such as a coordinate system of the 2D calibration pattern 366A, the control circuit 111 may be configured to determine a coordinate at which the first imaginary plane, second imaginary plane, and third imaginary plane intersect. This coordinate may be a location of one of the first set of corners (e.g., a corner of the face 362A that is directly above corner 364b of FIG. 3C). In an embodiment, the determination of this intersection may occur after the control circuit 111 has determined information which identifies a fourth imaginary plane and a fifth imaginary plane, as discussed below in more detail.

More specifically, in the above example, the first imaginary plane, the second imaginary plane, and the third imaginary plane may be defined by, or more generally co-planar with, a first face 362A, a second face 362B, and a third face 362C of the first set of faces 362A-362E of the polyhedron 362. In an embodiment, the control circuit 111 may be configured to determine information which identifies a fourth imaginary plane that is defined by, or more generally co-planar with, a fourth face 362D of the first set of faces 362A-362E of the polyhedron (e.g., 362). This determination may be based on a defined dimension "d" of the polyhedron 362 of the 3D calibration pattern 360. As stated above, the defined dimension "d" may be part of a 3D model of the polyhedron 362. The 3D model may indicate, for instance, that the polyhedron 362 is a cube. The control circuit 111 may determine that, because the polyhedron 362 is a cube having a dimension "d", the fourth face 362D is thus parallel to the first face 362A, and is separated from the first face 362A by a distance equal to the defined dimension "d". The control circuit 111 may then determine the fourth imaginary plane as an imaginary plane which is parallel to the first imaginary plane and is separated from the first imaginary plane by a distance equal to the dimension "d".

Similarly, the control circuit 111 may be configured to determine information which identifies a fifth imaginary plane that is defined by, or more generally co-planar with, a fifth face 362E (of FIG. 3E). For instance, the control circuit may determine, because the polyhedron 362 is a cube with dimension "d", the fifth face 362E therefore is parallel with the third face 362C, and is separated from the third face 362C by a distance equal to the dimension "d". The control circuit 111 may then determine the fifth imaginary plane as an imaginary plane which is parallel with the third imaginary plane and which is separated from the third imaginary plane by a distance equal to the dimension "d".

In an embodiment, the control circuit 111 may determine coordinates of points at which the first imaginary plane through the fifth imaginary plane intersect with each other, wherein each of the points is an intersection of at least three imaginary planes from among the first imaginary plane through the fifth imaginary plane. In the example described above, the first imaginary plane through the fifth imaginary plane may have at least four points of intersection, wherein each point of intersection is an intersection of at least three of the imaginary planes. These four points of intersection may coincide with the four corners of the face 36A of the polyhedron 362. These four corners may be the first set of corners recited above. In an embodiment, these four corners may be a set of top corners of the polyhedron 362. In an embodiment, the control circuit 111 determines the above coordinates initially in a coordinate system of, e.g., Pattern 1, which is the 2D calibration pattern 366A. The control circuit 111 may be configured to use $T_{Camera\ 1}^{2D\ Pattern1}$ to convert these coordinates from being in the coordinate system of Pattern 1 to being in the coordinate system of the first camera 170/370. These coordinates may be considered as an additional set of coordinates, which may be used to determine the first set of coordinates of the corners of the additional face (e.g., 362F) of the polyhedron in step 205.

More specifically, referring back to step 205, the control circuit 111 may, in an embodiment, determine the first set of coordinates for the set of respective corners of the additional face (e.g., face 362F) of the polyhedron (e.g., 362) of the 3D calibration pattern 160/360 based on coordinates determined above for the first set of corners. For instance, the respective corners of the additional face (e.g., corners 364a-364d) in step 205 may be bottom corners of the polyhedron (e.g., polyhedron 362), while the first set of corners described above (e.g., corners of the face 362A) may be top corners of the polyhedron. In some instances, the coordinates of the first set of corners may be referred to as an additional set of coordinates or as a third set of coordinates. In such an instance, the control circuit 111 may be configured to determine the first set of coordinates for the corners of the additional face (e.g., the bottom corners) based on the additional set of coordinates or the third set of coordinates for the first set of corners (e.g., the top corners) and based on a defined dimension of the polyhedron (e.g., 362) of the 3D calibration pattern 360.

For example, the control circuit 111 may be configured to determine the first set of coordinates, which are for the corners of the additional face of the polyhedron, as a set of coordinates which are each separated from a respective coordinate of the additional set of coordinates by a distance equal to the defined dimension "d". For instance, if the additional set of coordinates include the coordinates $[x_1, y_1, z_1]$, $[x_2, y_2, z_2]$, $[x_3, y_3, z_3]$, $[x_4, y_4, z_4]$ in a coordinate system of the calibration pattern 366A of the 3D calibration pattern 360, the control circuit 111 may determine corresponding coordinates of the first set of coordinates as being equal to $[x_1, y_1, z_1-d]$, $[x_2, y_2, z_2-d]$, $[x_3, y_3, z_3-d]$, $[x_4, y_4, z_4-d]$, also in a coordinate system of the calibration pattern 366A. In such an example, the control circuit 111 may be configured to multiply each of $[x_1, y_1, z_1-d]$, $[x_2, y_2, z_2-d]$, $[x_3, y_3, z_3-d]$, $[x_4, y_4, z_4-d]$ by $T_{Camera\ 1}^{2D\ Pattern1}$, or an inverse thereof, so as to convert these coordinates from being in the coordinate system of the calibration pattern 366A to being in the coordinate system of the first camera 370.

Returning to FIG. 2, the method 200 may further include a step 207, in which the control circuit 111 may determine, based on the second set of one or more calibration images received in step 203, a second set of coordinates for representing the set of respective corners (e.g., 364a-364d) of the additional face (e.g., 362F) of the polyhedron (e.g., 362) relative to a location and orientation of the second camera 180/380. In an embodiment, the second set of coordinates may be in a coordinate system of the second camera 180/380. As discussed below in more detail with respect to step 209, the control circuit 111 may be configured to determine a spatial relationship between the first camera 170/370 and the second camera 180/380 by determining a transformation function that converts the first set of coordinates to the second set of coordinates, or vice versa. The first set of coordinates may be determined from at least one calibration image of the first set of calibration images, and the second set of coordinates may be determined from one or more corresponding calibration images of the second set of one or more calibration images. As discussed above, a calibration image acquired by the first camera 170/370 and a calibration image acquired by the second camera 180/380 may correspond with each other if the 3D calibration pattern 160/360 remained stationary relative to both cameras between when the two calibration images were acquired. In this embodiment, the control circuit 111 may determine the second set of coordinates by identifying pixel coordinates (e.g., four pixel coordinates) at which the set of respective corners (e.g., 364a-364d) appear in one of the second set of calibration images, and applying an inverse projection matrix $K_{Camera2}^{-1}$ to the pixel coordinates to determine corresponding coordinates of the respective corners in a coordinate system of the second camera 180/380. In an embodiment, the control circuit 111 may perform step 207 for each calibration image of the second set of one or more calibration images.

In an embodiment, if the second set of one or more calibration images includes at least one pair of a first calibration image (e.g., 400 of FIG. 5A) acquired by the second camera 180/380 with a first lighting condition and a second calibration image (e.g., 450 of FIG. 5B) acquired by the second camera 180/380 with a second lighting condition, step 207 may be performed using both the first calibration image of the pair and the second calibration image of the pair. If the second set of one or more calibration images includes multiple pairs of a respective first calibration image and a respective second calibration image, step 207 may be performed for each pair using the respective first calibration image of the pair and the respective second calibration image of the pair. An example of such an embodiment is illustrated in FIGS. 5C and 5D. More specifically, FIG. 5C depicts a portion of the first calibration image 400 acquired by the second camera 180/380 with a first lighting condition, and FIG. 5D depicts a portion of the second calibration image 450 acquired by the second camera 180/380 with a second lighting condition. In this example, the control circuit 111 may determine, based on the second calibration image 450 of FIGS. 5B and 5D, a set of pixel regions in which respective corners of the additional 2D calibration pattern (e.g., 2D calibration pattern 366F) appear in the second calibration image 450 of the pair of images acquired by the second camera 180/380. For instance, FIG. 5D depicts an example in which the control circuit 111 has determined a set of pixel regions 480a-480d in which four respective corners of the additional calibration pattern 366F (of FIG. 3E) appears. In an embodiment, the control circuit 111 may determine or otherwise identify the set of pixel regions 480a-480d as regions in the second calibration image 450 which are near respective peripheral pattern elements (e.g., peripheral dots) that appear in the second calibration image 450. In some instances, a peripheral pattern element may be a pattern element that has no neighboring pattern element on at least one side of that pattern element, or that has no neighboring pattern element on multiple sides of that pattern element. For instance, FIG. 5D depicts peripheral pattern elements 482a-482d that appear in the second calibration image 450, wherein each of the peripheral pattern elements 482-482d have no neighboring pattern element on at least two sides of the peripheral pattern element. In some cases, as illustrated in FIG. 5D, each of the pixel regions 480a-480d may have a defined size, and/or may be separated from the respective peripheral pattern elements 482a-482d by a defined distance. In other cases, each of the pixel regions 480a-480d may encompass the respective peripheral pattern elements 482a-482d.

In an embodiment, when the control circuit 111 has identified or otherwise determined the pixel regions 480a-480d in the second calibration image 450 of FIG. 5D, the control circuit may search the first calibration image 400 of FIG. 5C, also within the set of pixel regions 480a-480d, to identify pixel coordinates at which the set of respective corners (e.g., 364a-364d of FIG. 3C) of the additional face (e.g., 362F) appear in the first calibration image 400 of the pair of images acquired by the second camera 180/380. For instance, if the control circuit 111 determines, from the second calibration image 450 of the pair of images, that one of the pixel regions is a rectangular region bounded by pixels $[u_1, v_1], [u_2, v_2], [u_3, v_3], [u_4, v_4]$, the control circuit 111 may search the same rectangular region (i.e., the region bounded by pixels $[u_1, v_1], [u_2, v_2], [u_3, v_3], [u_4, v_4]$) in the first calibration image 400 of the pair of images to identify a pixel coordinate $[u_a, v_a]$ of one of the respective corners of the additional face of the polyhedron.

In an embodiment, the second set of coordinates for the set of respective corners in step 207 are determined based on the pixel coordinates at which the set of respective corners appear in the first calibration image (e.g., 400) of the pair of calibration images acquired by the second camera 180/380. For instance, as stated above, the control circuit 111 may identify a pixel coordinate $[u_a, v_a]$ of one of the respective corners of the additional face of the polyhedron. In this example, the control circuit 111 may then determine one of the second set of coordinates [x' y' z'] based on the result of calculating $K_{Camera2}^{-1} [u_a, v_a]^T$.

The above embodiment involving using a pair of calibration images that were acquired using different respective lighting conditions may improve a robustness by which the pixel coordinates of the respective corners of the additional face are determined. For instance, with reference to FIGS. 5A-5D, the first calibration image 400 of the pair may include imaging error as a result of distortion caused by a transparent material of the platform 150/350, or by some other source of imaging error. In some cases, the imaging error may cause some portions of the first calibration image 400 to erroneously appear as a corner of a face of a polyhedron of the 3D calibration pattern 160/360. However, the control circuit 111 may avoid erroneously identifying such portions as a corner of the face of the polyhedron by limiting its search to only those pixel regions identified from the second calibration image 450 of the pair. The second calibration image 450 may allow the pixel regions to be identified with sufficient accuracy by relying on dots or other pattern elements that are visible in the second calibration image 450, and searching only regions next to or around some of those pattern elements, to detect the corners of the face of the polyhedron. As a result, using a combination of the first calibration image 400 acquired with a first lighting condition and the second calibration image 450 acquired with a second lighting condition may improve a robustness by which the pixel coordinates of the respective corners of the additional face of the 3D calibration pattern 160/360 are determined.

In an embodiment, step 207 may involve adjusting the second set of coordinates based on information from the second calibration image 450 of FIG. 5B and 5D. For instance, the control circuit 111 may determine, based on the silhouette 412 of the additional face (e.g., face 362F) captured in the first calibration image 400 of FIG. 5A and 5C, a first estimate of the second set of coordinates of the set of respective corners (e.g., 364a-364d) of the additional face (e.g., face 362F) of the polyhedron (e.g., polyhedron 362). As an example, the control circuit 111 may determine the first estimate of coordinates of the corners 364-364d as $[a_1', b_1', c_1'], [a_2', b_2', c_2'], [a_3', b_3', c_3']$, and $[a_4', b_4', c_4']$. The control circuit 111 may adjust the first estimate based on whether the first estimate of coordinates of the corners 364-364d fall on an imaginary plane, wherein the imaginary plane is determined based on pattern elements that appear in the second calibration image 450. More specifically, the control circuit 111 may further determine, based on the additional 2D calibration pattern (e.g., 2D calibration pattern 366F) captured in the second calibration image 450, information describing an imaginary plane formed by the additional face (e.g., 362F) of the polyhedron. For instance, the imaginary plane may be a plane defined by at least three dots or other pattern elements of the additional 2D calibration pattern 366F, wherein the at least three dots are not co-linear. Then, the control circuit 111 may determine respective amounts of deviation between the first estimate of the second set of coordinates (e.g., $[a_1', b_1', c_1']$, $[a_2', b_2', c_2']$, $[a_3', b_3', c_3']$, and $[a_4', b_4', c_4']$) and the imaginary plane. The amount of deviation for a particular estimated coordinate may be, e.g., a smallest distance or shortest distance between the estimated coordinate and the imaginary plane. In this embodiment, the control circuit 111 may determine a second estimate of the second set of coordinates (e.g., $[x_1', y_1', z_1']$, $[x_2', y_2', z_2']$, $[x_3', y_3', z_3']$, and $[x_4', y_4', z_4']$) based on the respective amounts of deviation between the first estimate of the second set of coordinates and the imaginary plane. For instance, the control circuit 111 may determine the second estimate of the second set of coordinates (e.g., $[x_1', y_1', z_1']$, $[x_2', y_2', z_2']$, $[x_3', y_3', z_3']$, and $[x_4', y_4', z_4']$) by adjusting the first estimate of the second set of coordinates (e.g., $[a_1', b_1', c_1']$, $[a_2', b_2', c_2']$, $[a_3', b_3', c_3']$, and $[a_4', b_4', c_4']$) in a manner that reduces the respective amounts of deviation between the adjusted estimate of the second set of coordinates and the imaginary plane. In this embodiment, the second estimate of the second set of coordinates may be used in step 209, which is discussed below in more detail.

Returning to FIG. 2, the method 200 may further include a step 209, in which the control circuit 111 may determine, based on the first set of coordinates and the second set of coordinates, a transformation function that describes a spatial relationship between the first camera 170/370 and the second camera 180/380. The spatial relationship may describe, e.g., a location and orientation of the first camera 170/370 relative to the second camera 180/380, or vice versa. In an embodiment, the transformation function may be a matrix $T_{Camera\ 1}^{Camera\ 2}$ that describes a linear transformation between a coordinate system of Camera 1, which is the first camera 170/370, and a coordinate system of Camera 2, which is the second camera 180/380. In an embodiment, step 209 may involve determining the matrix $T_{Camera\ 1}^{Camera\ 2}$ based on the equation (in homogeneous form):

$$\begin{bmatrix} X \\ Y \\ Z \\ 1 \end{bmatrix}_{Camera1}^{CornerN,\ Calibration\ Image\ M} = \qquad \text{Equation 4}$$

$$T_{Camera1}^{Camera2} \begin{bmatrix} X' \\ Y' \\ Z' \\ 1 \end{bmatrix}_{Camera2}^{CornerN,\ Corresponding\ Calibration\ Image(s)}$$

In the above example, $[X\ Y\ Z]^T$ may be one of the first set of coordinates determined in step 205, and may be relative to a location and orientation of the first camera 170/370 (e.g., in a coordinate system of the first camera 170/370). For instance, the coordinate $[X\ Y\ Z]^T$ may be a coordinate of, e.g., bottom corner 364a of FIG. 3C, and may be determined from a calibration image M that is one of the first set of calibration images received in step 201, such as the calibration image 500 of FIG. 4A. In this example, $[X'\ Y'\ Z']^T$ may be one of the second set of coordinates determined in step 207, and may be relative to a location and orientation of the second camera 170/370 (e.g., in a coordinate system of the second camera 180/380). Further, the coordinate $[X'\ Y'\ Z']^T$ may be a coordinate of the same corner (e.g., bottom corner 364a) as represented by $[X\ Y\ Z]^T$, and may be determined from one or more calibration images of the second set of calibration images of step 203 that correspond to calibration image M. For instance, the one or more calibration images may be calibration images 400 and 450 of FIGS. 4A and 4B. As stated above, the calibration image 400/450 may correspond to the calibration image 500 if the 3D calibration pattern 160/360 has remained stationary relative to the first camera 170/370 and the second camera 180/380 between when the calibration image 400/450 was acquired and when the calibration image 500 was acquired. In an embodiment, step 209 may involve determining a matrix $T_{Camera\ 1}^{Camera\ 2}$ that best satisfies the above equation for each combination of Corner N and Calibration Image M.

In an embodiment, the transformation function (e.g., $T_{Camera\ 1}^{Camera\ 2}$) may be referred to as a first transformation function. In such an embodiment, the control circuit 111 may perform the camera calibration by determining a second transformation function (e.g., $T_{Platform}^{Camera1}$) that describes a relationship between the first camera 170/370 and the platform 150/350 (e.g., a center 355 of the platform 350). This determination may be part of a hand-eye calibration for the first camera 170/370, as discussed above.

In an embodiment, the control circuit 111 may perform hand-eye calibration for the second camera 180/380 based on the first transformation function and based on the hand-eye calibration that was performed for the first camera 170/370. For instance, the control circuit 111 may determine, based on the first transformation function (e.g., $T_{Camera\ 1}^{Camera\ 2}$) and the second transformation function (e.g., $T_{Platform}^{Camera1}$) a third transformation function that describes a relationship between the second camera 180/380 and the platform 150/350 (e.g., a center 355 of the platform 350). For instance, the third transformation function may be determined based on the relationship:

$$T_{Platform}^{Camera\ 2} = T_{Platform}^{Camera\ 1} T_{Camera\ 1}^{Camera\ 2} \qquad \text{Equation 5}$$

In an embodiment, the method 200 may be performed for a system (e.g., system 100A of FIG. 1D) having a third camera 190. In some instances, the third camera 190 may be disposed adjacent to (e.g., disposed over) the first surface 152/352 of the platform 150/350 and may be pointed toward the first surface 152/352 of the platform 150/350, wherein the first surface 152/352 is disposed between the third camera 190 and the second surface 354 of the platform 150/350. In such an embodiment, the communication interface 113 may communicate with the third camera 190, and the control circuit 111 may perform camera calibration further by: receiving a third set of calibration images via the communication interface 113 from the third camera 190, where the third set of calibration images also capture the first set of faces (e.g., faces 362A-362E) of the polyhedron (e.g., polyhedron 362) and the first set of respective 2D calibration patterns (e.g., 2D calibration patterns 366A-366E) disposed on the first set of faces. The control circuit 111 may determine an additional transformation function (e.g., $T_{Camera\ 1}{}^{Camera\ 3}$), wherein the additional transformation function describes a spatial relationship between the first camera 170/370 and the third camera 190. In some cases, the additional transformation function may be performed based on a stereo calibration technique.

Returning to FIG. 2, the method 200 may further include a step 211, in which the control circuit 111 may, after the camera calibration has been performed and when an object other than the 3D calibration pattern 160/360 is disposed on the first surface 152/352 of the platform 150/350, generate a 3D model (e.g., point cloud) of the object for representing the object, wherein the 3D model is generated based on the transformation function from step 209 (e.g. $T_{Camera\ 1}{}^{Camera\ 2}$) based on images of the object received via the communication interface 113 from the first camera 170/370, and based on images of the object received via the communication interface 113 from the second camera 180/380. The object may be, e.g., a package or a piece of merchandise in a warehouse, or a component to be assembled onto a product in a manufacturing plant. In some implementations, the 3D model may be determined based on a transformation function that describes a relationship between the first camera 170/370 and the platform 150/350 (e.g., $T_{Platform}{}^{Camera\ 1}$) and another transformation function that describes a relationship between the second camera 180/380 and the platform 150/350 (e.g., $T_{Platform}{}^{Camera\ 2}$). In an embodiment, the control circuit 111 may be configured to communicate the 3D model to a robot operation system 101 via the communication interface 113, so as to facilitate interaction between a robot of the robot operation system 101 and the object (or with other 3D objects having a same shape and/or size as the object).

Concise Description of Various Embodiments

Embodiment 1 relates to a computing system comprising a communication interface and a control circuit. The communication interface is configured to communicate with: (i) a first camera, (ii) a second camera, and (iii) an actuator for rotating a platform that is transparent and that is disposed between the first camera and the second camera, wherein the first camera is pointed toward a first surface of the platform, and the second camera is pointed toward a second and opposite surface of the platform. The control circuit is configured to perform camera calibration when a three-dimensional (3D) calibration pattern is disposed on the first surface of the platform, wherein the 3D calibration pattern comprises a polyhedron having a plurality of faces that include a first set of faces and an additional face that is not part of the first set of faces, and comprises a first set of 2D calibration patterns disposed on respective faces of the first set of faces. The camera calibration is performed by: receiving a first set of calibration images via the communication interface from the first camera, wherein the first set of calibration images capture the first set of faces of the polyhedron and capture the first set of 2D calibration patterns disposed respectively on the first set of faces, without capturing the additional face of the polyhedron; receiving a second set of one or more calibration images via the communication interface from the second camera, wherein the second set of one or more calibration images capture the additional face of the polyhedron; determining, based on the first set of 2D calibration patterns, a first set of coordinates for representing a set of respective corners of the additional face of the polyhedron, wherein the first set of coordinates are relative to a location and orientation of the first camera; determining, based on the second set of one or more calibration images, a second set of coordinates for representing the set of respective corners of the additional face of the polyhedron, wherein the second set of coordinates are relative to a location and orientation of the second camera; determining, based on the first set of coordinates and the second set of coordinates, a transformation function for describing a spatial relationship between the first camera and the second camera. The control circuit is further configured, after the camera calibration has been performed and when an object other than the 3D calibration pattern is disposed on the first surface of the platform, to generate a 3D model for representing the object, wherein the 3D model is generated based on the transformation function, based on images of the object received via the communication interface from the first camera, and based on images of the object received via the communication interface from the second camera.

Embodiment 2 includes the computing system of embodiment 1, wherein the communication interface is further configured to communicate with: (i) a first light source pointed toward the first surface of the platform, and (ii) a second light source pointed toward the second surface of the platform, wherein the platform is disposed between the first light source and the second light source. Further, the second set of one or more calibration images include at least one pair of calibration images that include a first calibration image and a second calibration image. The control circuit is configured, when performing the camera calibration: to output via the communication interface a first set of one or more light source commands to the first light source and to the second light source for causing the first light source to be activated and the second light source to be deactivated, to output via the communication interface a first set of one or more camera commands to the second camera for causing the second camera to generate the first calibration image of the at least one pair of calibration images while the first light source is activated and the second light source is deactivated, wherein the first calibration image captures at least a silhouette of the additional face of the polyhedron, to output via the communication interface a second set of one or more light source commands to the first light source and to the second light source for causing the second light source to be activated and the first light source to be deactivated, to output via the communication interface a second set of one or more camera commands to the second camera for causing the second camera to generate the second calibration image of the at least one pair of calibration images while the second light source is activated and the first light source is deactivated, wherein the second calibration image captures an additional 2D calibration pattern, which is disposed on the additional face and is part of the 3D calibration pattern. The control circuit is configured to determine the second set of coordinates based on the first calibration image and the second calibration image of the at least one pair of calibration images.

Embodiment 3 includes computing system of embodiment 2, wherein the control circuit is configured to perform the camera calibration when the first camera and the first light source are disposed above the first surface of the platform, the second camera and the second light source are disposed under the second surface of the platform, and the additional face of the 3D calibration pattern is in contact with the first surface of the platform.

Embodiment 4 includes computing system of embodiment 2 or 3, wherein the control circuit is configured, when performing the camera calibration: to determine, based on the second calibration image of the at least one pair of calibration images, a set of pixel regions in which respective corners of the additional calibration pattern appear in the second calibration image; to search the first calibration image of the at least one pair of calibration images, also within the set of pixel regions, to identify pixel coordinates at which the set of respective corners of the additional face appear in the first calibration image. The second set of coordinates for the set of respective corners are determined based on the pixel coordinates at which the set of respective corners appear in the first calibration image.

Embodiment 5 includes computing system of any one of embodiments 2-4, wherein the control circuit is configured, when performing the camera calibration: to determine, based on the silhouette of the additional face captured in the first calibration image of the at least one pair of calibration images, a first estimate of the second set of coordinates of the set of respective corners of the additional face of the polyhedron, to determine, based on the additional calibration pattern captured in the second calibration image, information describing an imaginary plane formed by the additional face, to determine respective amounts of deviation between the imaginary plane and the first estimate of the second set of coordinates, and to determine a second estimate of the second set of coordinates based on the respective amounts of deviation. The transformation function is determined based on the second estimate of the second set of coordinates and based on the first set of coordinates.

Embodiment 6 includes the computing system of any one of embodiments 1-5, wherein each calibration image of the first set of calibration images captures at least two 2D calibration patterns of the first set of 2D calibration patterns. The control circuit is configured, for each calibration image of the first set of calibration images: to extract, from the calibration image, a first image portion that captures a first 2D calibration pattern of the at least two 2D calibration patterns, to store information describing pattern elements of the first 2D calibration pattern, to generate an updated calibration image by removing the first image portion from the calibration image, to extract, from the updated calibration image, another image portion that captures a second 2D calibration pattern of the at least two 2D calibration patterns, and to store information describing pattern elements of the second 2D calibration pattern, wherein the control circuit is configured to determine an estimate of a calibration parameter of the first camera based on stored information describing pattern elements of the first 2D calibration pattern of the at least two 2D calibration patterns and stored information describing pattern elements of the second 2D calibration pattern of the at least two 2D calibration patterns.

Embodiment 7 includes the computing system of any one of embodiments 1-6, wherein the control circuit is configured, when performing the camera calibration, to determine a 3D model for representing the polyhedron based on the first set of 2D calibration patterns in the first set of calibration images. The first set of coordinates for the set of respective corners of the additional face of the polyhedron are determined based on the 3D model of the polyhedron.

Embodiment 8 includes computing system of embodiment 7, wherein the control circuit is configured, when performing camera calibration, to determine, based on the first set of 2D calibration patterns, information describing respective imaginary planes formed by the first set of faces of the polyhedron, wherein the 3D model is represented by at least the information describing the respective imaginary planes.

Embodiment 9 includes the computing system of embodiment 8, wherein the control circuit is configured, when performing the camera calibration, to determine a spatial relationship between the first set of faces of the polyhedron. The information describing the respective imaginary planes is determined based on the spatial relationship between the first set of faces of the polyhedron.

Embodiment 10 includes computing system of embodiment 8 or 9, wherein the set of corners of the additional face of the polyhedron are a second set of corners of the polyhedron. The control circuit is configured, when performing the camera calibration, to determine, as an additional set of coordinates, respective locations for a first set of corners of the polyhedron by determining where at least three of the respective imaginary planes intersect. The first set of coordinates are determined based on the additional set of coordinates and a defined size of the polyhedron.

Embodiment 11 includes the computing system of any one of embodiments 1-10, wherein the transformation function is a first transformation function, and wherein the control circuit is configured to perform the camera calibration further by: determining a second transformation function for describing a spatial relationship between the first camera and a center of the platform, determining, based on the first transformation function and the second transformation function: a third transformation function for describing a spatial relationship between the second camera and the center of the platform.

Embodiment 12 includes the computing system of claim any one of embodiments 1-11, wherein the control circuit is configured to output one or more motor commands via the communication interface to the platform to cause the platform to rotate the 3D calibration pattern to have multiple orientations relative to the first camera, and wherein the first set of calibration images are respectively generated when the 3D calibration pattern has the multiple orientations relative to the first camera.

Embodiment 13 includes the computing system of claim any one of embodiments 1-12, wherein the communication interface is configured to communicate with a third camera pointed toward the first surface of the platform. The control circuit is configured to perform camera calibration further by: receiving a third set of calibration images via the communication interface from the third camera, wherein the third set of calibration images also capture the first set of faces of the polyhedron and the first set of respective 2D calibration patterns, determining, based on the first set of calibration images and the third set of calibration images, an additional transformation function, wherein the additional transformation function describes a spatial relationship between the first camera and the third camera.

Embodiment 14 relates to a non-transitory computer-readable medium having instructions thereon that, when executed by a control circuit of a computing system, causes the control circuit to receive, via a communication interface of the computing system, a first set of calibration images, wherein the communication interface is configured to communicate with: (i) a first camera, (ii) a second camera, and (iii) an actuator configured to rotate a platform that is transparent and that is disposed between the first camera and the second camera, wherein the first camera is pointed toward a first surface of the platform, and the second camera is pointed toward a second and opposite surface of the platform. The first set of calibration images are received from the first camera and are generated when a three-dimensional (3D) calibration pattern is disposed on the first surface of the platform, wherein the 3D calibration pattern comprises a polyhedron having a plurality of faces that include a first set of faces and an additional face that is not part of the first set of faces, and comprises a first set of 2D calibration patterns disposed on respective faces of the first set of faces of the polyhedron. The first set of calibration images capture the first set of faces and the first set of 2D calibration patterns disposed respectively on the first set of faces, without capturing the additional face of the polyhedron. The instructions, when executed by the control circuit, further cause the control circuit to receive a second set of one or more calibration images via the communication interface from the second camera, wherein the second set of one or more calibration images capture the additional face of the polyhedron; to determine, based on the first set of 2D calibration patterns, a first set of coordinates for representing a set of respective corners of the additional face of the polyhedron, wherein the first set of coordinates are relative to a location and orientation; to determine, based on the second set of one or more calibration images, a second set of coordinates for representing the set of respective corners of the additional face of the polyhedron, wherein the second set of coordinates are relative to a location and orientation of the second camera; to determine, based on the first set of coordinates and the second set of coordinates, a transformation function for describing a spatial relationship between the first camera and the second camera, to generate, when an object other than the 3D calibration pattern is disposed on the first surface of the platform, a 3D model for representing the object, wherein the 3D model is generated based on the transformation function based on images of the object received via the communication interface from the first camera, and based on images of the object received via the communication interface from the second camera.

Embodiment 15 relates to a method for object scanning, comprising: receiving, by a computing system, a first set of calibration images via a communication interface of the computing system, wherein the communication interface is configured to communicate with: (i) a first camera, (ii) a second camera, and (iii) an actuator configured to rotate a platform that is transparent, (ii) a first camera facing a first surface of the platform and that is disposed between the first camera and the second camera, wherein the first camera is pointed toward a first surface of the platform, and the second camera is pointed toward a second and opposite surface of the platform. The first set of calibration images are received from the first camera and are generated when a three-dimensional (3D) calibration pattern is disposed on the first surface of the platform, wherein the 3D calibration pattern comprises a polyhedron having a plurality of faces that include a first set of faces and an additional face that is not part of the first set of faces, and comprises a first set of 2D calibration patterns disposed on respective faces of the first set of faces of the polyhedron. The first set of calibration images capture the first set of faces and capture the first set of 2D calibration patterns disposed respectively on the first set of faces, without capturing the additional face of the polyhedron. The method further comprises: receiving a second set of one or more calibration images via the communication interface from the second camera, wherein the second set of one or more calibration images capture the additional face of the polyhedron; determining, based on the first set of 2D calibration patterns, a first set of coordinates for representing a set of respective corners of the additional face of the polyhedron, wherein the first set of coordinates are relative to a location and orientation; determining, based on the second set of one or more calibration images, a second set of coordinates for representing the set of respective corners of the additional face of the polyhedron, wherein the second set of coordinates are relative to a location and orientation the second camera; determining, based on the first set of coordinates and the second set of coordinates, a transformation function for describing a spatial relationship between the first camera and the second camera; generating, when an object other than the 3D calibration pattern is disposed on the first surface of the platform, a 3D model for representing the 3D object, wherein the 3D model is generated based on the transformation function based on images of the object received via the communication interface from the first camera, and based on images of the object received via the communication interface from the second camera.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A computing system comprising:
    a communication interface configured to communicate with: (i) a first camera, (ii) a second camera, and (iii) an actuator for rotating a platform that is transparent and that is disposed between the first camera and the second camera, wherein the first camera is pointed toward a first surface of the platform, and the second camera is pointed toward a second and opposite surface of the platform; and
    a control circuit configured to perform camera calibration when a three-dimensional (3D) calibration pattern is disposed on the first surface of the platform, wherein the 3D calibration pattern comprises a polyhedron having a plurality of faces that include a first set of faces and an additional face that is not part of the first set of faces, and comprises a first set of 2D calibration patterns disposed on respective faces of the first set of faces, wherein the camera calibration is performed by:
        receiving a first set of calibration images via the communication interface from the first camera, wherein the first set of calibration images capture the first set of faces of the polyhedron and capture the first set of 2D calibration patterns disposed respectively on the first set of faces, without capturing the additional face of the polyhedron;
        receiving a second set of one or more calibration images via the communication interface from the second camera, wherein the second set of one or more calibration images capture the additional face of the polyhedron;
        determining, based on the first set of 2D calibration patterns, a first set of coordinates for representing a set of respective corners of the additional face of the polyhedron, wherein the first set of coordinates are relative to a location and orientation of the first camera;
        determining, based on the second set of one or more calibration images, a second set of coordinates for representing the set of respective corners of the additional face of the polyhedron, wherein the second set of coordinates are relative to a location and orientation of the second camera; and determining, based on the first set of coordinates and the second set of coordinates, a transformation function for describing a spatial relationship between the first camera and the second camera, wherein the control circuit is further configured, after the camera calibration has been performed and when an object other than the 3D calibration pattern is disposed on the first surface of the platform, to generate a 3D model for representing the object, wherein the 3D model is generated based on the transformation function, based on images of the object received via the communication interface from the first camera, and based on images of the object received via the communication interface from the second camera.

2. The computing system of claim 1, wherein the communication interface is further configured to communicate with: (i) a first light source pointed toward the first surface of the platform, and (ii) a second light source pointed toward the second surface of the platform, wherein the platform is disposed between the first light source and the second light source, wherein the second set of one or more calibration images include at least one pair of calibration images that include a first calibration image and a second calibration image, wherein the control circuit is configured, when performing the camera calibration:

to output via the communication interface a first set of one or more light source commands to the first light source and to the second light source for causing the first light source to be activated and the second light source to be deactivated, to output via the communication interface a first set of one or more camera commands to the second camera for causing the second camera to generate the first calibration image of the at least one pair of calibration images while the first light source is activated and the second light source is deactivated, wherein the first calibration image captures at least a silhouette of the additional face of the polyhedron, to output via the communication interface a second set of one or more light source commands to the first light source and to the second light source for causing the second light source to be activated and the first light source to be deactivated, and to output via the communication interface a second set of one or more camera commands to the second camera for causing the second camera to generate the second calibration image of the at least one pair of calibration images while the second light source is activated and the first light source is deactivated, wherein the second calibration image captures an additional 2D calibration pattern, which is disposed on the additional face and is part of the 3D calibration pattern, wherein the control circuit is configured to determine the second set of coordinates based on the first calibration image and the second calibration image of the at least one pair of calibration images.

3. The computing system of claim 2, wherein the control circuit is configured to perform the camera calibration when the first camera and the first light source are disposed above the first surface of the platform, the second camera and the second light source are disposed under the second surface of the platform, and the additional face of the 3D calibration pattern is in contact with the first surface of the platform.

4. The computing system of claim 2, wherein the control circuit is configured, when performing the camera calibration:

to determine, based on the second calibration image of the at least one pair of calibration images, a set of pixel regions in which respective corners of the additional calibration pattern appear in the second calibration image; and to search the first calibration image of the at least one pair of calibration images, also within the set of pixel regions, to identify pixel coordinates at which the set of respective corners of the additional face appear in the first calibration image, wherein the second set of coordinates for the set of respective corners are determined based on the pixel coordinates at which the set of respective corners appear in the first calibration image.

5. The computing system of claim 2, wherein the control circuit is configured, when performing the camera calibration:

to determine, based on the silhouette of the additional face captured in the first calibration image of the at least one pair of calibration images, a first estimate of the second set of coordinates of the set of respective corners of the additional face of the polyhedron, to determine, based on the additional calibration pattern captured in the second calibration image, information describing an imaginary plane formed by the additional face, to determine respective amounts of deviation between the imaginary plane and the first estimate of the second set of coordinates, and to determine a second estimate of the second set of coordinates based on the respective amounts of deviation, wherein the transformation function is determined based on the second estimate of the second set of coordinates and based on the first set of coordinates.

6. The computing system of claim 1, wherein each calibration image of the first set of calibration images captures at least two 2D calibration patterns of the first set of 2D calibration patterns, and wherein the control circuit is configured, for each calibration image of the first set of calibration images:

to extract, from the calibration image, a first image portion that captures a first 2D calibration pattern of the at least two 2D calibration patterns, to store information describing pattern elements of the first 2D calibration pattern, to generate an updated calibration image by removing the first image portion from the calibration image, to extract, from the updated calibration image, another image portion that captures a second 2D calibration pattern of the at least two 2D calibration patterns, and to store information describing pattern elements of the second 2D calibration pattern, wherein the control circuit is configured to determine an estimate of a calibration parameter of the first camera based on stored information describing pattern elements of the first 2D calibration pattern of the at least two 2D calibration patterns and stored information describing pattern elements of the second 2D calibration pattern of the at least two 2D calibration patterns.

7. The computing system of claim 1, wherein the control circuit is configured, when performing the camera calibration, to determine a 3D model for representing the polyhedron based on the first set of 2D calibration patterns in the first set of calibration images, wherein the first set of coordinates for the set of respective corners of the additional face of the polyhedron are determined based on the 3D model of the polyhedron.

8. The computing system of claim 7, wherein the control circuit is configured, when performing camera calibration, to determine, based on the first set of 2D calibration patterns, information describing respective imaginary planes formed by the first set of faces of the polyhedron, wherein the 3D model is represented by at least the information describing the respective imaginary planes.

9. The computing system of claim 8, wherein the control circuit is configured, when performing the camera calibration, to determine a spatial relationship between the first set of faces of the polyhedron, wherein the information describing the respective imaginary planes is determined based on the spatial relationship between the first set of faces of the polyhedron.

10. The computing system of claim 8, wherein the set of corners of the additional face of the polyhedron are a second set of corners of the polyhedron, wherein the control circuit is configured, when performing the camera calibration:

to determine, as an additional set of coordinates, respective locations for a first set of corners of the polyhedron by determining where at least three of the respective imaginary planes intersect, wherein the first set of coordinates are determined based on the additional set of coordinates and a defined size of the polyhedron.

11. The computing system of claim 1, wherein the transformation function is a first transformation function, and wherein the control circuit is configured to perform the camera calibration further by:

determining a second transformation function for describing a spatial relationship between the first camera and a center of the platform, and determining, based on the first transformation function and the second transformation function: a third transformation function for describing a spatial relationship between the second camera and the center of the platform.

12. The computing system of claim 1, wherein the control circuit is configured to output one or more motor commands via the communication interface to the platform to cause the platform to rotate the 3D calibration pattern to have multiple orientations relative to the first camera, and wherein the first set of calibration images are respectively generated when the 3D calibration pattern has the multiple orientations relative to the first camera.

13. The computing system of claim 1, wherein the communication interface is configured to communicate with a third camera pointed toward the first surface of the platform, wherein the control circuit is configured to perform camera calibration further by:

receiving a third set of calibration images via the communication interface from the third camera, wherein the third set of calibration images also capture the first set of faces of the polyhedron and the first set of respective 2D calibration patterns, and determining, based on the first set of calibration images and the third set of calibration images, an additional transformation function, wherein the additional transformation function describes a spatial relationship between the first camera and the third camera.

14. A non-transitory computer-readable medium having instructions thereon that, when executed by a control circuit of a computing system, causes the control circuit to receive, via a communication interface of the computing system, a first set of calibration images, wherein the communication interface is configured to communicate with: (i) a first camera, (ii) a second camera, and (iii) an actuator configured to rotate a platform that is transparent and that is disposed between the first camera and the second camera, wherein the first camera is pointed toward a first surface of the platform, and the second camera is pointed toward a second and opposite surface of the platform, wherein the first set of calibration images are received from the first camera and are generated when a three-dimensional (3D) calibration pattern is disposed on the first surface of the platform, wherein the 3D calibration pattern comprises a polyhedron having a plurality of faces that include a first set of faces and an additional face that is not part of the first set of faces, and comprises a first set of 2D calibration patterns disposed on respective faces of the first set of faces of the polyhedron, wherein the first set of calibration images capture the first set of faces and the first set of 2D calibration patterns disposed respectively on the first set of faces, without capturing the additional face of the polyhedron, wherein the instructions, when executed by the control circuit, further cause the control circuit to receive a second set of one or more calibration images via the communication interface from the second camera, wherein the second set of one or more calibration images capture the additional face of the polyhedron;

to determine, based on the first set of 2D calibration patterns, a first set of coordinates for representing a set of respective corners of the additional face of the polyhedron, wherein the first set of coordinates are relative to a location and orientation of the first camera;

to determine, based on the second set of one or more calibration images, a second set of coordinates for representing the set of respective corners of the additional face of the polyhedron, wherein the second set of coordinates are relative to a location and orientation of the second camera;

to determine, based on the first set of coordinates and the second set of coordinates, a transformation function for describing a spatial relationship between the first camera and the second camera, to generate, when an object other than the 3D calibration pattern is disposed on the first surface of the platform, a 3D model for representing the object, wherein the 3D model is generated based on the transformation function based on images of the object received via the communication interface from the first camera, and based on images of the object received via the communication interface from the second camera.

15. The non-transitory computer-readable medium of claim 14, wherein the communication interface is further configured to communicate with: (i) a first light source pointed toward the first surface of the platform, and (ii) a second light source pointed toward the second surface of the platform, wherein the platform is disposed between the first light source and the second light source, wherein the second set of one or more calibration images include at least one pair of calibration images that include a first calibration image and a second calibration image, wherein the instructions, when executed by the control circuit, further cause the control circuit:
to output via the communication interface a first set of one or more light source commands for causing the first light source to be activated and for causing the second light source to be deactivated,
to output via the communication interface a first set of one or more camera commands to the second camera for causing the second camera to generate the first calibration image of the at least one pair of calibration images while the first light source is activated and the second light source is deactivated, wherein the first calibration image captures at least a silhouette of the additional face of the polyhedron,
to output via the communication interface a second set of one or more light source commands for causing the first light source to be deactivated and for causing the second light source to be activated,
to output via the communication interface a second set of one or more camera commands to the second camera for causing the second camera to generate the second calibration image of the at least one pair of calibration images while the second light source is activated and the first light source is deactivated, wherein the second calibration image captures an additional 2D calibration pattern, which is disposed on the additional face and is part of the 3D calibration pattern, and
to determine the second set of coordinates based on the first calibration image and the second calibration image of the at least one pair of calibration images.

16. The non-transitory computer-readable medium of 14, wherein the instructions, when executed by the control circuit, further causes the control circuit, to determine a 3D model for representing the polyhedron based on the first set of 2D calibration patterns in the first set of calibration images,
wherein the first set of coordinates for the set of respective corners of the additional face of the polyhedron are determined based on the 3D model of the polyhedron.

17. The non-transitory computer-readable medium of claim 15, wherein each calibration image of the first set of calibration images captures at least two 2D calibration patterns of the first set of 2D calibration patterns, and wherein the instructions, when executed by the control circuit, further causes the control circuit, for each calibration image of the first set of calibration images:
to extract, from the calibration image, a first image portion that captures a first 2D calibration pattern of the at least two 2D calibration patterns,
to store information describing pattern elements of the first 2D calibration pattern,
to generate an updated calibration image by removing the first image portion from the calibration image,
to extract, from the updated calibration image, another image portion that captures a second 2D calibration pattern of the at least two 2D calibration patterns, and
to store information describing pattern elements of the second 2D calibration pattern, wherein the control circuit is configured to determine an estimate of a calibration parameter of the first camera based on stored information describing pattern elements of the first 2D calibration pattern of the at least two 2D calibration patterns and stored information describing pattern elements of the second 2D calibration pattern of the at least two 2D calibration patterns.

18. The non-transitory computer-readable medium of claim 14, wherein the transformation function is a first transformation function, and wherein the instructions, when executed by the control circuit, cause the control circuit to further perform the following:
determining a second transformation function for describing a relationship between the first camera and a center of the platform, and
determining, based on the first transformation function and the second transformation function: a third transformation function for describing a relationship between the second camera and the center of the platform.

19. A method for object scanning, comprising:
receiving, by a computing system, a first set of calibration images via a communication interface of the computing system, wherein the communication interface is configured to communicate with: (i) a first camera, (ii) a second camera, and (iii) an actuator configured to rotate a platform that is transparent and is disposed between the first camera and the second camera, wherein the first camera is pointed toward a first surface of the platform, and the second camera is pointed toward a second and opposite surface of the platform,
wherein the first set of calibration images are received from the first camera and are generated when a three-dimensional (3D) calibration pattern is disposed on the first surface of the platform, wherein the 3D calibration pattern comprises a polyhedron having a plurality of faces that include a first set of faces and an additional face that is not part of the first set of faces, and comprises a first set of 2D calibration patterns disposed on respective faces of the first set of faces of the polyhedron,
wherein the first set of calibration images capture the first set of faces and capture the first set of 2D calibration patterns disposed respectively on the first set of faces, without capturing the additional face of the polyhedron,
wherein the method further comprises:
receiving a second set of one or more calibration images via the communication interface from the second camera, wherein the second set of one or more calibration images capture the additional face of the polyhedron;
determining, based on the first set of 2D calibration patterns, a first set of coordinates for representing a set of respective corners of the additional face of the polyhedron, wherein the first set of coordinates are relative to a location and orientation of the first camera;
determining, based on the second set of one or more calibration images, a second set of coordinates for representing the set of respective corners of the additional face of the polyhedron, wherein the second set of coordinates are relative to a location and orientation the second camera;
determining, based on the first set of coordinates and the second set of coordinates, a transformation function for describing a spatial relationship between the first camera and the second camera; and
generating, when an object other than the 3D calibration pattern is disposed on the first surface of the platform, a 3D model for representing the object, wherein the 3D model is generated based on the transformation function based on images of the object received via the communication interface from the first camera, and based on images of the object received via the communication interface from the second camera.

20. The method of claim 19, wherein the communication interface is further configured to communicate with: (i) a first light source pointed toward the first surface of the platform, and (ii) a second light source pointed toward the second surface of the platform, wherein the platform is disposed between the first light source and the second light source, wherein the second set of one or more calibration images include at least one pair of calibration images that include a first calibration image and a second calibration image, wherein the method further comprises:

outputting via the communication interface a first set of one or more light source commands for causing the first light source to be activated and for causing the second light source to be deactivated, outputting via the communication interface a first set of one or more camera commands for causing the second camera to generate the first calibration image of the at least one pair of calibration images while the first light source is activated and the second light source is deactivated, wherein the first calibration image captures at least a silhouette of the additional face of the polyhedron, outputting via the communication interface a second set of one or more light source commands for causing the first light source to be deactivated and for causing the second light source to be activated, and outputting via the communication interface a second set of one or more camera commands for causing the second camera to generate the second calibration image of the at least one pair of calibration images while the second light source is activated and the first light source is deactivated, wherein the second calibration image captures an additional 2D calibration pattern, which is disposed on the additional face and is part of the 3D calibration pattern, wherein the determining of the second set of coordinates is based on the first calibration image and the second calibration image of the at least one pair of calibration images.

* * * * *